United States Patent
Masson et al.

(10) Patent No.: US 9,817,242 B2
(45) Date of Patent: Nov. 14, 2017

(54) IMAGE PROJECTOR AND OPTICAL ASSEMBLY

(71) Applicant: LEMOPTIX SA, Lausanne (CH)

(72) Inventors: Jonathan Masson, Pully (CH); Dominique Marchal, Vallorbe (CH)

(73) Assignee: INTEL CORPORATION, Santa Clara, CA (US)

( * ) Notice: Subject to any disclaimer, the term of this patent is extended or adjusted under 35 U.S.C. 154(b) by 110 days.

(21) Appl. No.: 14/774,686

(22) PCT Filed: Sep. 5, 2014

(86) PCT No.: PCT/EP2014/068947
§ 371 (c)(1),
(2) Date: Sep. 10, 2015

(87) PCT Pub. No.: WO2016/034247
PCT Pub. Date: Mar. 10, 2016

(65) Prior Publication Data
US 2016/0202478 A1    Jul. 14, 2016

(51) Int. Cl.
| | | |
|---|---|---|
| G03B 21/60 | (2014.01) | |
| G02B 27/48 | (2006.01) | |
| G02B 26/08 | (2006.01) | |
| G02B 27/14 | (2006.01) | |
| G03B 21/602 | (2014.01) | |

(Continued)

(52) U.S. Cl.
CPC ......... *G02B 27/48* (2013.01); *G02B 26/0833* (2013.01); *G02B 26/101* (2013.01); *G02B 27/0101* (2013.01); *G02B 27/142* (2013.01); *G03B 21/602* (2013.01); *H04N 9/3129* (2013.01); *G02B 3/0006* (2013.01); *G02B 5/288* (2013.01); *G02B 2027/011* (2013.01); *G02B 2027/0118* (2013.01); *G02B 2207/117* (2013.01)

(58) Field of Classification Search
CPC ........ G02B 26/10; G02B 27/01; G02B 27/48; G02B 27/60; G02B 26/08; G02B 27/14; G02B 27/22; G02B 27/30; G02B 27/58; G02B 5/08; G02B 7/182; G03B 3/00; G03B 21/60; H04N 5/74; H04N 9/31
See application file for complete search history.

(56) References Cited

U.S. PATENT DOCUMENTS

2009/0161191 A1    6/2009    Powell

FOREIGN PATENT DOCUMENTS

| EP | 1329760 A2 | 7/2003 |
|---|---|---|
| EP | 1522885 A1 | 4/2005 |

(Continued)

OTHER PUBLICATIONS

Office Action received for Japanese Patent Application No. 2016-546153, dated Oct. 25, 2016, 4 pages including 3 pages English translation.

(Continued)

*Primary Examiner* — Sultan Chowdhury
*Assistant Examiner* — Danell L Owens

(57) ABSTRACT

An image projector is disclosed that can include a light source and a MEMS mirror to receive a light beam emitted by the light source and oscillate to scan the light beam across multiple-beam-generators that each include a planar beam splitter arranged to receive the light beam and generate multiple beams to project an image.

16 Claims, 7 Drawing Sheets

(51) Int. Cl.
*G02B 26/10* (2006.01)
*H04N 9/31* (2006.01)
*G02B 27/01* (2006.01)
*G02B 3/00* (2006.01)
*G02B 5/28* (2006.01)

(56) References Cited

FOREIGN PATENT DOCUMENTS

| JP | EP 1522885 A1 * | 4/2005 | ......... G02B 27/1033 |
|----|----|----|----|
| JP | 2004-45684 | 9/2005 | |
| JP | 2013-254031 A | 12/2013 | |
| WO | 2014/111163 A1 | 7/2014 | |

OTHER PUBLICATIONS

International Search Report and Written Opinion, dated May 19, 2015, Application No. PCT/EP2014/068947, Filed Date: Sep. 5, 2014, pp. 5.

* cited by examiner

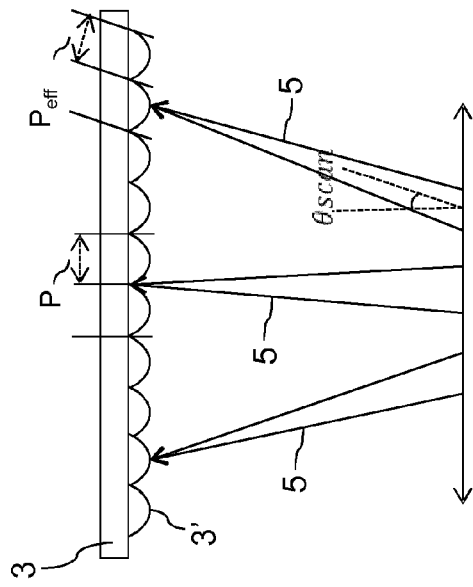
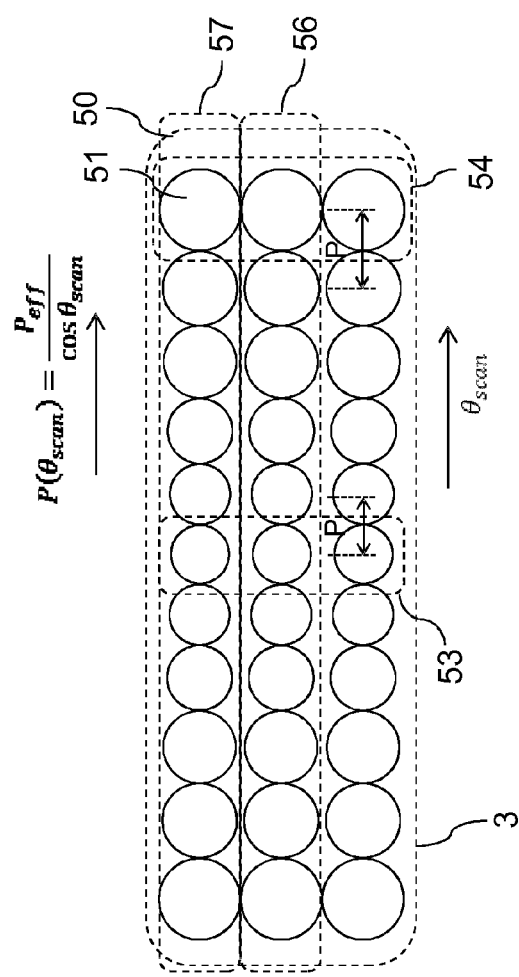
Fig. 5a
Fig. 5b
Fig. 5

IMAGE PROJECTOR AND OPTICAL ASSEMBLY

FIELD OF THE INVENTION

The present invention concerns an image projector and optical assembly which comprises the image projector, which is suitable for use in a head-up-display, and which is configured to achieve a reduction in both speckle and morié.

DESCRIPTION OF RELATED ART

In projection assemblies light projected onto a projection screen can cause speckle which reduces the resolution of the projected image. For example, in projection assemblies which comprise a head-up-display, coherent light is projected onto the head-up-display so that a projected image appears on the head-up-display.

In projection assemblies which comprise a head-up-display the head-up-display is typically provided in the form of a transparent screen (e.g. a windscreen of a vehicle); the coherent light is projected onto the transparent screen so that a virtual image is visible at some point beyond the screen. The surface of the transparent screen is never perfectly smooth; accordingly when the coherent light is projected onto the transparent screen the transparent screen will randomly diffuse the coherent light thereby creating random inference which causes speckle which reduces the resolution of the virtual image.

In order to resolve this problem of speckle which occurs in projection assemblies which comprise a head-up-displays, it is known to provide the head-up-display in the form of a microlens array (or in the form of a micromirror array). The surface of each lens in the microlens array is perfectly smooth, accordingly it will not randomly diffuse the coherent light it receives; therefore no random inference or speckle is created. However, when the coherent light is projected onto the microlens array the microlens array will cause regular diffraction and regular interference known as moiré. The moiré appears as variations in intensity across the virtual image; accordingly the moiré compromises the quality of the projected image.

Many solutions in the prior art address exclusively the problem of speckle or moiré however none of the solutions provide an single adequate solutions with addresses both problems. US20040257664 discloses a solution to speckle but this solution is not effective to reduce moiré because the system is not configured to create an angle between the multiple beams which would allow the interference of the first beam to be averaged with the interference of the second beam by having the interference maxima of the second beam fit between the interference maxima of the first beam.

Other solutions of the prior art use anti-moiré filters or anti-aliasing filters but these solutions provide no means for adequate speckle reduction; moreover these solutions cannot incorporate a speckle reduction means such as a microlens array because they project polarised light and a microlens array cannot reduce the speckle in polarized light because the speckle or moiré pattern for microlens are the same for both orthogonal orientation of the polarization.

It is an aim of the present invention to mitigate or obviate at least some of the above-mentioned problems.

BRIEF SUMMARY OF THE INVENTION

According to an aspect of the present invention there is provided an image projector comprising, a light source for providing a light beam; a MEMS mirror which is arranged such that it can receive the light beam, and which can oscillate about at least one oscillation axis to scan said light beam; one or more multiple-beam-generators each of the one or more multiple-beam-generators comprising, a planar beam splitter which is arranged to receive the light beam reflected by the MEMS mirror, and a planar reflector which can receive the part of the light beam which is transmitted through the planar beam splitter, so that each of the one or more multiple-beam-generators can generated multiple beams, and wherein the planar beam splitter and planar reflector are arranged to be in parallel; and a focusing lens which is arranged to receive multiple beams which are generated by the one or more multiple-beam-generators; wherein, in each of the one or more multiple-beam-generators the distance (h) between the planar beam splitter and planar reflector is such that the optical distance (OD) between the planar beam splitter and planar reflector is greater than, or equal to, half the coherent length of the light beam.

Preferably the light beam is a collimated light beam. Preferably the light source is configured to provide a collimated light beam.

The one or more multiple beam generators may comprise a planar beam splitter element, which defines the planar beam splitter, and a planar reflector element, which defines the planar reflector, arranged in parallel and spaced apart such that there is an air-gap between the planar beam splitter element and a planar reflector element and wherein the optical distance (OD) is defined as:

$$OD = \frac{t}{\cos(\theta_2)} + \frac{h}{\cos\left[\sin^{-1}\left(\frac{n\sin\theta_2}{n_3}\right)\right]}$$

$$\theta_2 = \sin^{-1}\left(\frac{n_1 \sin\theta_i}{n}\right)$$

wherein 't' is the thickness of the planar beam splitter element, '$\Theta_i$' is the incidence angle of the light beam on the planar beam splitter element, 'n1' is the refractive index of the material in which the light beam passes before it is incident on the planar beam splitter element, 'n' is the refractive index of planar beam splitter element, 'h' is the distance between the planar beam splitter element and planar reflector element, 'n3' is the refractive index of the air in the air-gap.

The one or more multiple beam generators may comprise a block of transparent material, and a planar coating of semi-reflective material on a first surface of the block, which defines the planar beam splitter, and a planar coating of reflective material provided on a second, opposite, surface of the block which defines the planar reflector, and wherein the optical distance (OD) is defined as:

$$OD = \frac{h}{\cos(\theta_2)}$$

wherein h is the distance between the coating of semi-reflective material and the coating of reflective material, and $\Theta_2$ is $$\theta_2 = \sin^{-1}\left(\frac{n_1 \sin\theta_i}{n}\right)$$

wherein '$\Theta_i$' is the incidence (AOI) of the light beam on the planar coating of semi-reflective material, 'n1' is the refractive index of the material in which the light beam passes before it is incident on planar coating of semi-reflective material, 'n' is the refractive index planar coating of semi-reflective material.

The image projector may comprise a plurality of multiple-beam-generators, which are arranged to be in optical communication, and wherein the planar beam splitter and planar bean reflector of each of the plurality of multiple-beam-generators lie on, or are arranged parallel to, differently orientated planes.

The planar beam splitter may be configured to have a beam splitting ratio of 40% reflection to 60% transmission. Preferably the planar beam splitter is configured to have a beam splitting ratio of 45% reflection and 55% transmission.

The planar beam splitter may be arranged such that the part of the light beam which has transmitted through the planar beam splitter and is reflected by the planar reflector, can pass directly to the focusing lens without passing through the planar beam splitter. For example the position of the planar beam splitter may be offset from the position of planar reflector so that the planar beam splitter does not completely overlay the planar reflector. Alternatively the planar beam splitter may have a smaller dimension than the planar reflector so that the planar beam splitter does not completely overlay the planar reflector. A combination of both offset positioning and smaller dimensions is also possible.

According to an aspect of the present invention there is provided an optical assembly comprising, an image projector according to any one of the preceding claims, and a screen arranged to receive light which has passed through the focusing lens, wherein the screen is configured to diffuse light it receives, and a head-up-display which is arranged to receive light which is diffused by the screen.

The screen is preferably a diffuser; the screen may be a microlens array, a micromirror array, or a white-board.

Preferably the image projector is positioned such that the focusing lens of the image projector is located at a distance from the screen which is equal to the focal length of the focusing lens.

The optical assembly may be configured to have a numerical aperture which is greater than the numerical aperture of the viewer. Preferably the optical assembly may be configured to have a numerical aperture which is greater than a predefined numerical aperture value which represents the numerical aperture of a viewer. Most preferably the optical assembly may be configured to have a numerical aperture which is greater than 0.016. The numerical aperture of the the optical assembly is defined as (d/2)/(F·M), wherein M is the magnification of the head-up-display, F is the focal length of the of the focusing lens, and d is the distance between two consecutive multiple light beams which are output from the multiple beam generator and prior to said multiple light beams being incident on the focusing lens.

The optical assembly may be configured such that 'd' satisfies the condition:

$$d = 2(t\tan\theta_2 + h\tan\theta_3)\cos\theta_i$$

$$\theta_2 = \sin^{-1}\left(\frac{n_1\sin\theta_i}{n}\right)$$

$$\theta_3 = \sin^{-1}\left(\frac{n_1\sin\theta_2}{n}\right)$$

wherein 't' is the thickness of the planar beam splitter, '$\Theta_i$' is the angle of incidence (AOI) of the light beam on the planar beam splitter, 'n1' is the refractive index of the material in which the light beam passes before it is incident on the planar beam splitter, 'n' is the refractive index of planar beam splitter, 'h' is the distance between the planar beam splitter and planar reflector, 'n3' is the refractive index of the material which occupies the space between planar beam splitter and planar reflector. For example: 't' may be the thickness of a planar beam splitter element, '$\Theta_i$' may be the angle of incidence (AOI) of the light beam on the planar beam splitter element, 'n1' is the refractive index of the material in which the light beam passes before it is incident on the planar beam splitter element (e.g. 'n1' may be the refractive index of air), 'n' may be the refractive index of planar beam splitter element, 'h' is the distance between the planar beam splitter element and a planar reflector element, 'n3' is the refractive index of the material which occupies the space between planar beam splitter element and planar reflector element (e.g. 'n3' may be the refractive index of air).

The optical assembly may be configured such that 'd' satisfies the condition:

$$d = 2h\tan\left[\sin^{-1}\left(\frac{\sin\theta_i}{n}\right)\right]\cos\theta_i$$

wherein 'h' is the distance between the planar beam splitter and the planar beam reflector, n is the refractive index of the material between the planar beam splitter and planar beam reflector, $\Theta_i$ is the angle of incidence of the light beam on the of semi-reflective material. For example 'h' may be the distance between a coating of semi-reflective material provided on a surface of a transparent block and a. coating of reflective material provided on an opposite surface of the transparent block, n may be the refractive index of a transparent block, $\Theta_i$ may be the angle of incidence of the light beam on the of coating of semi-reflective material.

The optical assembly may be configured such that 'd' satisfies the condition:

$$d = 2F\tan\frac{\theta_P}{4}(2k+1)$$

wherein F is the focal length of the of the focusing lens, k is an integer which is the order of the multiple-beam-generator, and $\Theta_p$ equal to:

$$\theta_P = \frac{\lambda}{P}$$

wherein λ is the wavelength of the light beam and 'P' is the pitch of the microlens array.

k can be any integer: 0, 1, 2, 3, 4, ... it should preferably be chosen such that it will make the OD greater than or equal to half the coherence length of the coherent light beam. It can also be chosen so as to ensure that the OD is greater than or equal to half the coherence length of the coherent light beam for all the wavelength λ used in the light beam (for example where h=5.12 choosing k=4, 5, 6 for the light bean red, green, blue respectively).

The optical assembly may be configured such that the distance 'h' between the planar beam splitter and the planar reflector is equal to:

$$h = \frac{d}{2\tan\left[\sin^{-1}\left(\frac{\sin\theta_i}{n}\right)\right]\cos\theta_i}$$

wherein 'n' is the refractive index of material between the planar beam splitter and the planar reflector, $\Theta_i$ is the angle of incidence of the light beam on the beam splitter, and 'd' is the distance between two consecutive multiple light beams which are output from the multiple beam generator and prior to said multiple light beams being incident on the focusing lens.

Preferably the distance 'h' between the planar beam splitter and the planar reflector is between 0.5 mm and 10 mm. More preferably the distance 'h' between the planar beam splitter and the planar reflector is between 3 mm-4 mm.

The screen may comprise a microlens array. The microlens array may comprise different sized microlens so that the microlens array has a plurality of different pitch lengths between microlens' in the microlens array.

The screen may comprise a micromirror array. The micromirror array may comprise different sized micromirrors so that the micromirror array has a plurality of different pitch lengths between micromirrors. The pitch (P) between consecutive microlens, or micromirrors, may be equal to:

$$P = (P_{eff}/\cos\Theta_{scan})$$

wherein $P_{eff}$ is a predefined effective pitch value and $\Theta_{scan}$ is the angle of incidence of the light from the projector device on the microlens or micromirrors. Typically the predefined effective pitch value will be a pitch value which the users desires the scanned light to experience as it is incident on the microlens/micromirror array. Because P varies along the scanning angle (i.e. the size of the microlens or micromirrors varies (increases or decreases depending on the direction of scanning)) the $P_{eff}$ remains constant, at a predefined value, throughout the whole of the scanning angle.

The pitch (P) between consecutive microlens, or micromirrors, may be equal to:

$$P = \frac{(2k+1)\lambda}{2\tan^{-1}\left\{\frac{2h}{F}\tan\left[\sin^{-1}\left(\frac{\sin\theta_i}{n}\right)\right]\cos\theta_i\right\}}$$

wherein k is an integer which is the order of the multiple beam generator, $\Theta i$ is the angle of incidence of the light beam of the planar beam splitter, F is the focal length of the collimating lens, λ is the wavelength of the light beam, 'h' is the distance between the planar beam splitter and the planar reflector, n is the refractive index of material between the planar beam splitter and the planar reflector.

In a further embodiment the consecutive emission of independent red, green and blue light beams from the light source is synchronization with the oscillation of the MEMS mirror, so that the red, green and blue light beams are incident on predefined respective points on the focusing lens, so as to compensate for chromatic aberration ensuring that the red, green and blue light beams are focused by the focusing lens onto the same point on the screen. Preferably the red, green and blue light beams define the red, green and blue colours of a pixel; and therefore the amount of red, green and blue light in each beam is proportional to the amount of red, green and blue light in the pixel to be projected.

BRIEF DESCRIPTION OF THE DRAWINGS

The invention will be better understood with the aid of the description of embodiments of the present invention, which are given by way of example only, and illustrated by the figures, in which:

FIG. 5a provides front view of an alternative configuration for the screen which can be used in the optical assembly of the present invention; FIG. 5b illustrates the problem which arises with the use of standard microlens arrays as a screen;

DETAILED DESCRIPTION OF POSSIBLE EMBODIMENTS OF THE INVENTION

Figure 1:
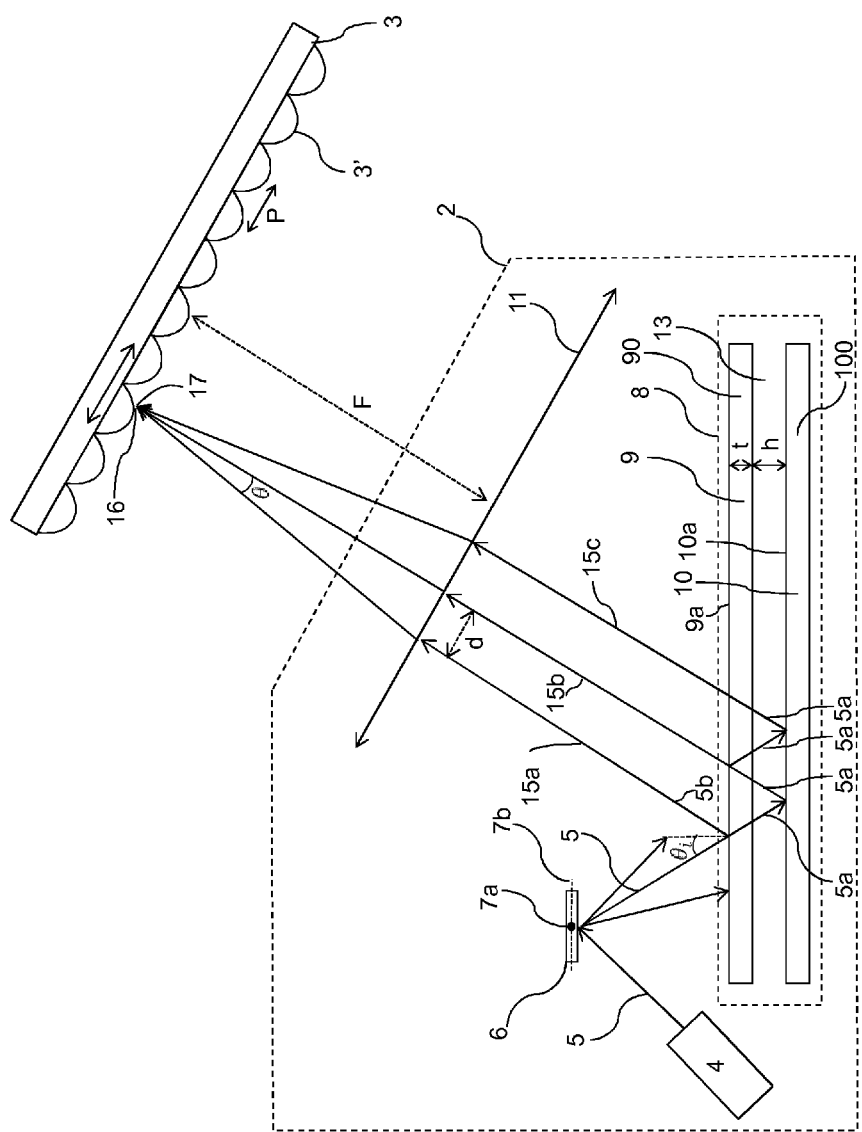
FIG. 1 shows a plan view of an optical assembly according to an embodiment of the present invention.

FIG. 1 shows a plan view of an optical assembly 1 according to an embodiment of the present invention. The optical assembly 1 comprises an image projector 2 according to an embodiment of the present invention, and a screen 3 in the form of a microlens array 3. The microlens array 3 comprises an array of microlens 3'.

It should be understood that the screen 3 is not limited to being a microlens array; the screen 3 may take any suitable form, for example the screen 3 may be a micromirror array or a diffuser such as a wall surface, white board or standard projector-screen. Furthermore, in this exemplary embodiment each of the microlens' 3' in the microlens array 3 is the same size; accordingly the pitch 'P' between the microlens' 3' in the microlens array 3 is constant across the microlens array 3. However, as will be described with respect to another embodiment of the invention, the microlens array may comprise microlens' which have different sizes such that the pitch between the microlens' in the microlens array differs across the microlens array. The pitch 'P' is the distance between the centre of a microlens to the centre of its neighbouring microlens.

The image projector 2 comprises, a light source 4 which provides a collimated light beam 5; and a MEMS mirror 6 which is arranged such that it can receive the collimated light beam 5. The MEMS mirror 6 is configured such that it can oscillate about two orthogonal oscillation axes 7a,b so that it can scan the collimated light beam 5 in two-dimensions. It will be understood that the MEMS mirror 6 could be configured to oscillate about any number of oscillation axes. For example the MEMS mirror 6 could be configured to oscillate about a single oscillation axes so that it can scan the collimated light beam 5 in one dimension. In a further variation the image projector 2 may comprise two MEMS mirrors, arranged to be in optical communication with each other, one of the MEMS mirrors being configured to oscillate about one oscillation axis and the second MEMS mirror being configured to oscillate about a second oscillation axis which is orthogonal to the first oscillation axis, so that collectively the two MEMS mirrors can scan the collimated light beam 5 in two-dimensions.

The image projector 2 further comprises a multiple-beam-generator 8. The multiple-beam-generator 8 comprises a planar beam splitter 9 in the form of a planar beam splitter element 90 which is arranged to receive the collimated light beam 5 reflected by the MEMS mirror 6. The planar beam splitter element 90 reflects part 5b of the collimated light beam 5 and transmits another part 5a of the collimated light beam 5. The planar beam splitter element 90 is configured to have a beam splitting ratio of 40% reflection to 60% transmission.

The multiple-beam-generator 8 further comprises a planar reflector 10 in the form of a planar reflector element 100 (e.g. a mirror) which can receive, and subsequently reflect, the part 5a of the collimated light beam which is transmitted through the planar beam splitter element 90. The multiple-beam-generator 8 thus generates multiple light beams 15a-c from the single collimated light beam 5. Only three multiple light beams 15a-c are illustrated in the figure for clarity, but it should be understood that the multiple-beam-generator 8 could generate any number of multiple light beams.

The planar beam splitter element 90 and planar reflector element 100 are arranged to be in parallel. The planar beam splitter element 90 and planar reflector element 100 are further arranged such that the optical distance between the planar beam splitter element 90 and the planar reflector element 100 is greater than, or equal to, half the coherent length of the collimated light beam 5 (Typically the coherent length of the collimated light beam 5 will be a fixed value; the coherent length of the collimated light beam 5 is a property of the light source 4 which generates the collimated light beam 5 and is given as part of the specification for the light source 4). The optical distance is defined as:

$$OD = \frac{t}{\cos(\theta_2)} + \frac{h}{\cos\left[\sin^{-1}\left(\frac{n\sin\theta_2}{n_3}\right)\right]}$$

$$\theta_2 = \sin^{-1}\left(\frac{n_1 \sin\theta_i}{n}\right)$$

wherein, 'OD' is the optical distance, 't' is the thickness of the planar beam splitter element 90, '$\Theta_i$' is the incidence (AOI) of the collimated beam 5 (preferably the central beam) on the planar beam splitter element 90, 'n1' is the refractive index of the material in which the collimated beam 5 passes before it is incident on the planar beam splitter element 90 (e.g. in this example the material in which the collimated beam passes before it is incident on the planar beam splitter element 90 is air so 'n1' is equal to the refractive index 'air'), 'n' is the refractive index of planar beam splitter element 90, 'h' is the distance between the planar beam splitter element 90 and planar reflector element 100, 'n3' is the refractive index of the material which occupies the space 13 between planar beam splitter element 90 and planar reflector element 100. In this embodiment the space 13 between the planar beam splitter element 90 and planar reflector element 100 is occupied by 'air' (i.e. there is an air gap 13 between the planar beam splitter element 90 and planar reflector element 100) and the collimated beam 5 passes through 'air' before it is incident on the planar beam splitter element 90 such that n1=n3=1, so that in this example the optical distance is defined as:

$$OD = \frac{t}{\cos\left[\sin^{-1}\left(\frac{\sin\theta_i}{n}\right)\right]} + \frac{h}{\cos(\theta_i)}$$

While this example shown in FIG. 1 illustrates the multiple-beam-generator 8 as comprising a planar beam splitter element 90 and planar reflector element 100 defining the planar beam splitter 9 and planar reflector respectively, and being separated by an air gap; it should be understood that the multiple-beam-generator 8 may have any other suitable configurations. For example in another embodiment a block of material, preferably transparent material (e.g glass), having a thickness 'h', occupies the space 13. The planar beam splitter 9 and planar reflector 10 are attached, abut to, or are formed on, opposite sides of the block of material thus the planar beam splitter 9 and planar reflector 10 are fixed distance 'h' apart ('h' in this case is equal to the thickness of the block of material). In this case the optical distance is defined as:

$$OD = \frac{h}{\cos(\theta_2)}$$

wherein 'h' is the distance between the planar beam splitter 9 and planar reflector 10 (i.e. the thickness of the block of material) and $\Theta_2$ is $$\theta_2 = \sin^{-1}\left(\frac{n_1 \sin\theta_i}{n}\right)$$

wherein '$\Theta_i$' is the incidence (AOI) of the collimated beam 5 (preferably the central beam) on the planar beam splitter element 90, 'n1' is the refractive index of the material in which the collimated beam 5 passes before it is incident on the planar beam splitter element 90 (e.g. in this example the material in which the collimated beam passes before it is incident on the planar beam splitter 90 is air so 'n1' is equal to the refractive index 'air'), 'n' is the refractive index of planar beam splitter element 90.

For example, in a variation of the embodiment shown in FIG. 1, the multiple-beam-generator may comprise a glass block with a beam splitter coating on one surface of the glass block and a reflective coating on a second, opposite surface of the glass block. In this variation the beam splitter coating defines the planar beam splitter 9 and the reflective coating defines the planar reflector 10, and the optical distance is defined as:

$$OD = \frac{h}{\cos(\theta_2)}$$

wherein 'h' is the distance between the beam splitter coating (i.e. the planar beam splitter 9) and the reflective coating (i.e. the planar reflector 10); in other words 'h' is equal to the thickness of the glass block, and $\Theta_2$ is $$\theta_2 = \sin^{-1}\left(\frac{n_1 \sin \theta_i}{n}\right)$$

wherein '$\Theta_i$' is the incidence (AOI) of the collimated beam 5 (preferably the central beam) on the planar beam splitter 9, 'n1' is the refractive index of the material in which the collimated beam 5 passes before it is incident on the planar beam splitter 9 (e.g. the refractive index 'air'), 'n' is the refractive index of planar beam splitter 9. The image projector 2 further comprises a focusing lens 11 which is arranged to receive the multiple light beams 15a-c which are output from the multiple beam generator 8.

The image projector 2 is arranged to be a distance 'F' equal to the focal length of the focusing lens 11, from the microlens array 3.

Advantageously, in the embodiment shown in FIG. 1, the planar beam splitter 9 (planar beam splitter element 90) and planar reflector 10 (planar reflector element 100) causes the collimated light beam 5 to be split into multiple light beams 15a-c; because the optical distance is greater than, or equal to, half the coherent length of the collimated light beam the multiple beams are 'independent'; two beam are 'independent' if the difference between their optical paths is greater than the coherence length of the light source which generated the two beams. Referring to the optical assembly 1 illustrated in FIG. 1 the light beam 15a is reflected only by the planar beam splitter element 90 whereas the consecutive (or neighbouring) light beam 15b is transmitted by the planar beam splitter element 90 and reflected by the planar reflector element 100 and transmitted again by the planar beam splitter element 90. Since the optical distance between the planar beam splitter element 90 and the planar reflector element 100 is greater than, or equal to, half the coherent length of the collimated light beam 5, the beam 15b travels an optical distance which is greater than the optical distance traveled by the beam 15a, by at least an amount equal to the coherence length of the light source 4. Thus consecutive (i.e. neighbouring) multiple light beams 15a and 15b are independent from each other. The other successive (i.e. neighbouring) multiple light beams (15c etc.) will also have optical paths which differ at least by a distance greater than or equal to the coherence length of the light source 4.

Since the planar beam splitter 9 (planar beam splitter element 90) and planar reflector 10 (the planar reflector element 100) are arranged in parallel the multiple light beams 15a-c are then focused onto the same point 16 on the microlens array 3 using the focusing lens 11, so as to define a single pixel 17 of a projected image at point 16. Since the collimated light beam 5 is split into multiple independent light beams 15a-c by the multiple beam generator 8, the multiple independent light beams 15a-c each produce their own speckle and moiré pattern; accordingly when the multiple light beams 15a-c are focused onto the same point 16 the speckle and moiré patterns of each of the multiple independent light beams 15a-c will overlap at point 16 and thus will average-out; accordingly the speckle and moiré which is visible to a viewer viewing the pixel 17 will be reduced. In practice it is the viewer's eyes that will average out the speckle and moiré patterns upon viewing the pixel 17. Each pixel of the image is projected onto the microlens array 3 in this manner so that there is a reduction in speckle and moiré pattern over the whole of the image projected on the microlens array 3.

To ensure that the optical distance between the planar beam splitter 9 (the planar beam splitter element 90) and the planar reflector 10 (the planar reflector element 100) is greater than, or equal to, half the coherence length of the collimated light beam, the manufacturer will typically calculate the smallest angle of incidence '$\Theta_i$' of the collimated light beam 5 (preferably the central beam) on the beam splitter 9. The smallest angle of incidence can be found for example, in the following manner: when the MEMS mirror 6 is at rest (i.e. the MEMS mirror 6 is not oscillating) the collimated light beam 5 reflected by the MEMS mirror 6 towards the beam splitter 9 defines what is referred to as the 'central beam. It should be noted that in this embodiment, and for each of the other embodiments described herein, when the MEMS mirror 6 is at rest it is not oscillating about oscillation axes 7a,b, and it is assumed that when the MEMS mirror 6 is at rest it will located at the centre of its amplitude of oscillation; for example if the MEMS mirror 6 can oscillation between ±45° then when the MEMS mirror 6 is at rest it will be positioned at 0°.

The manufacturer can adjust and measure the angle of incidence '$\Theta_i$' of the central beam on the beam splitter 9. Then, the smallest angle of incidence is equal to the angle of incidence '$\Theta_i$' of the central beam minus half the maximum angle over which the MEMS mirror can scan the collimated light beam 5. If the value for the smallest angle of incidence is less than 0° then 0° is taken to be smallest angle of incidence. Then, using the optical distance 'OD' formula described above and using the known refractive index of the materials composing the multiple beam generator, the manufacturer can adjust the dimension 't' and 'h' such that the optical distance is greater than, or equal to, half the coherence length of the collimated light beam which is known.

In another type of optical assembly there may be provided a plurality of different light sources use to generate the multiple independent light beams 15a-c, each light source generating one of the multiple independent light beams 15a-c. Since each of the light beams will come from different light sources the multiple light beams 15a-c will be "independent". For example a first light source could be used to generate the light beam 15a, a second light source could be used to generate light beam 15b and a third light source could be used to generate light beam 15c. In this variation no planar beam splitter 9 and planar reflector 10 is required; and the optical assembly may configured such that the first, second and third light sources generate respective light beams 15a-c which are passed directly to the focusing lens 11.

Figure 2:
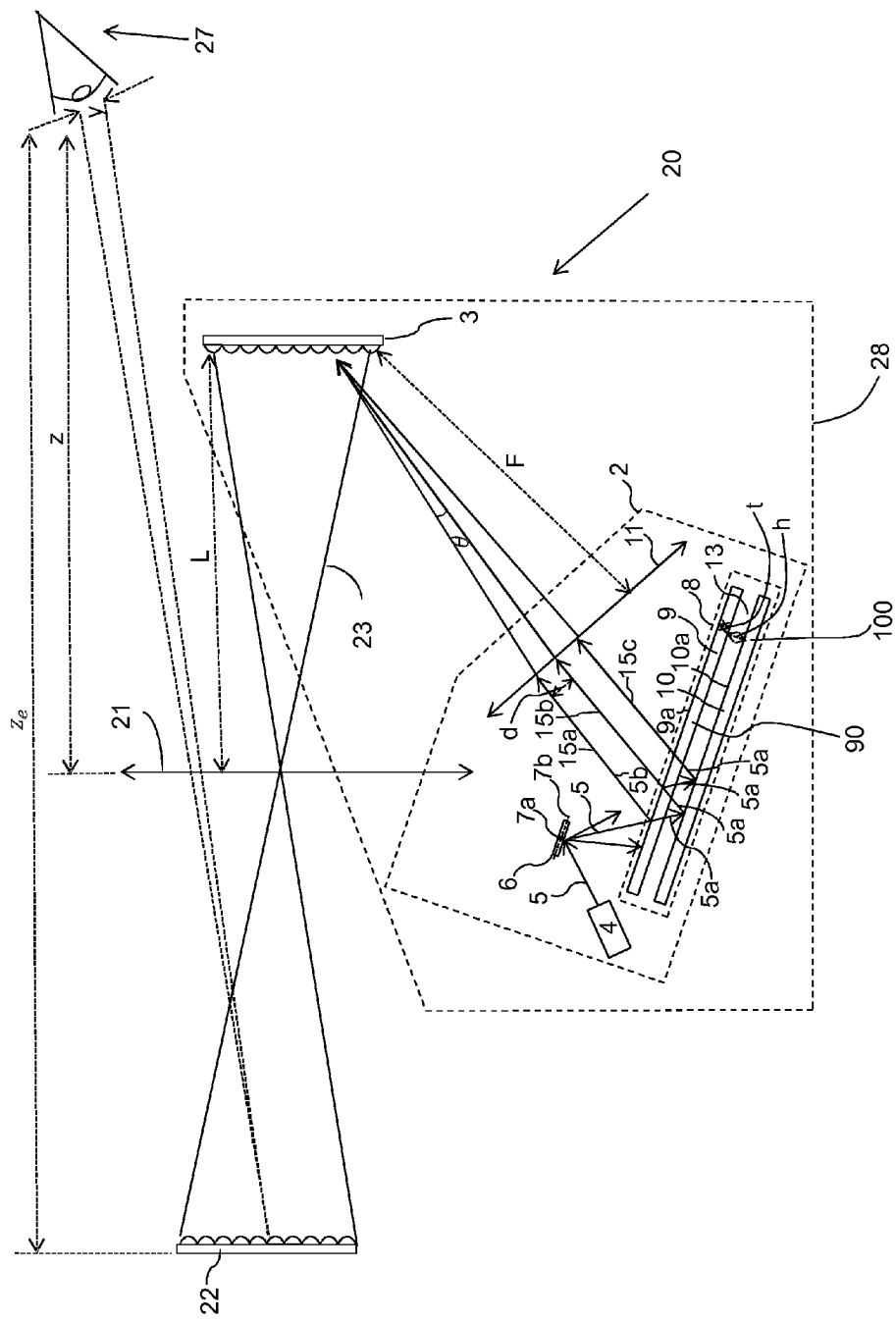
FIG. 2 shows a perspective view of an optical assembly according to a further embodiment of the present invention.

FIG. 2 shows a perspective view of an optical assembly 20 according to a further embodiment of the present invention. The optical assembly comprises many of the same features of the optical assembly 1 shown in FIG. 1 and like features are awarded the same reference numbers.

The optical assembly 20 further comprises a head-up-display 21 which is arranged to receive light from the microlens array 3. The head-up-display 21 is arranged a distance 'L' from the microlens array 3 wherein 'L' is equal to:

$$(Ze-z)/M$$

wherein 'Ze' is a distance from a predefined position where the optical assembly 20 projects a virtual image 22 to a predefined position where a viewer should view the virtual image 22, 'z' is a distance between the head-up-display 21 and the predefined position where a viewer should view the virtual image 22, and 'M' is the magnification of the head-up-display 21. The multiple light beams 15a-c which are focused onto the microlens array 3 by the focusing lens 11 are diffused by the microlens array 3. The diffused light 23 is passed through the head-up-display 21 to project a virtual image 22 at a location beyond the head-up-display 21. The virtual image 22 will be the same image as the image which is projected onto the microlens array 3, however the virtual image 22 may be larger (or smaller) as it may be magnified (or reduced) by the head-up-display 21.

The optical-assembly 20 is configured such that it has a numerical aperture which is larger than the numerical aperture of a viewer 27 who is viewing the virtual image 22. Preferably the optical assembly 20 is configured such that it has a numerical aperture which is greater than a predefined numerical aperture value which represents the numerical aperture of a viewer; the predefined numerical aperture value is usually 0.016. 0.016 is the largest numerical aperture of a viewer having a pupil size between 1 to 10 mm for a virtual image position which is greater than, or equal to, 300 mm from the viewer.

The numerical aperture of the optical assembly 20 is defined as:

$$(d/2)/(F \cdot M)$$

wherein M is the magnification of the head-up-display 21 and F is the focal length of the of the focusing lens 11, and 'd' is the distance between two consecutive (i.e. two neighbouring) multiple beams 15a-c output from the multiple beam generator 8 measured prior to being incident on the focusing lens 11 and is given by the equation:

$$d = 2(t \tan\theta_2 + h \tan\theta_3) \cos\theta_i$$

$$\theta_2 = \sin^{-1}\left(\frac{n_1 \sin\theta_i}{n}\right)$$

$$\theta_3 = \sin^{-1}\left(\frac{n \sin\theta_2}{n_3}\right)$$

wherein 't' is the thickness of the planar beam splitter element 90, is the incidence (AOI) of the collimated beam 5 (preferably the central beam) on the planar beam splitter element 90, 'n1' is the refractive index of the material in which the collimated beam 5 passes before it is incident on the planar beam splitter element 90 (which in this example is the refractive index 'air'), 'n' is the refractive index of planar beam splitter element 90, 'h' is the distance between the planar beam splitter element 90 and planar reflector element 100, 'n3' is the refractive index of the material which occupies the space 13 between planar beam splitter element 90 and planar reflector element 100 (which in this example is the refractive index 'air').

In a preferred variation of the embodiment shown in FIG. 2, 'd' preferably satisfies the following equation:

$$d = F \tan\left[(2k+1)\frac{\theta_P}{2}\right]$$

wherein $\Theta_p$ equal to:

$$\theta_P = \frac{\lambda}{P}$$

wherein λ is the wavelength of the collimated light beam 5 and 'P' is the pitch of the microlens array 3 which is the distance from the center of a microlens in the microlens array 3 to the center of its neighbouring microlens, k is an integer defining the order of the multiple beam generator 8, and $\Theta_p$ is the angular separation between the interference maxima (or minima) of one of the multiple light beams 15a-c; this means that successive interference maxima of the first light beam 15a will occur at $0\Theta_p$, $1\Theta_p$, $2\Theta_p$, $3\Theta_p$ . . . etc. In order for the maxima of the interference pattern another one of the multiple light beams 15a-c (e.g. second light beam 15b) to overlay the minima of the interference pattern of the first light beam 15a, its maxima of the interference pattern must fit between two successive maxima of the interference pattern of the first light beam 15a; accordingly the maxima of the interference pattern of the second light beam 15b must occur at $\Theta=\Theta_p/2$, $1.5\Theta_p$, $2.5\Theta_p$, $3.5\Theta_p$ . . . etc.

Thus calculation of 'd' using the condition $\Theta=\Theta_p/2$, $1.5\Theta_p$, $2.5\Theta_p$, $3.5\Theta_p$ . . . etc gives:

$$d = F \tan(\Theta) = F \tan(\Theta_p/2).$$

Because the interference are periodic, this equation is also true for every odd integer (2k+1) multiple such that:

$$d = F \tan[(2k+1)\Theta_p/2]$$

Advantageously when this condition for 'd' is satisfied, the moiré reduction is further increased.

The angle of incidence (AOI) '$\Theta_i$', of the collimated light beam 5 (preferably the central beam) on the beam splitter element 90 is the angle between the collimated light beam 5 and the normal vector to the planar surface 9a of the planar beam splitter element 90. Preferably the AOI is the angle between a central beam and the normal vector to the planar surface 9a of the planar beam splitter element 90, wherein the central beam is the beam reflected towards the planar surface 9a when the MEMS mirror 6 is at rest (i.e. is not oscillating about oscillation axes 7a,b, in other words when the MEMS mirror 6 is not actuated). For example, one could use the central beam to make the calculation to find suitable dimensions for the thickness 't' of the planar beam splitter element 90 and for the distance 'h' between the planar beam splitter element 90 and the planar reflector element 100 to ensure that the 'OD' of the planar beam splitter element 90 and the planar reflector element 100 is greater than, or equal to, half the coherence length of the calumniated light beam 5 and that the numerical aperture of the optical assembly 20 is larger than the numerical aperture of the viewer 27:

The central beam is found by measuring the angle between the collimated beam 5 projected on the beam splitter 9 when the MEMS mirror is at rest and the normal to the surface 9a of the beam splitter element 90. The refractive index of the planar beam splitter ('n') is a known value typically given from material datasheet. Suitable dimensions for 't' and 'h' are then chosen such that the optical distance 'OD' between the planar beam splitter element 90 and the planar reflector element 100 is greater than, or equal to, half the coherence length of the collimated light beam 5 and such that the numerical aperture of the optical assembly 20 (i.e. (d/2)/(FM)) is larger than the numerical aperture of the viewer 27.

The numerical aperture of the viewer 27 is defined by:

$$(y/2)/(Ze)$$

wherein y is the pupil size of the viewer 27, and Ze is a distance from a predefined position where the optical assembly 20 projects a virtual image 22 to a predefined position where a viewer will view the virtual image 22. The pupil size depends of each viewer physiognomy and ambient light conditions and may vary between 1 to 10 mm in size. The position/distance of the virtual image 22 with respect to the viewer 27 is preferably a predefined value and it is equal to 'Ze=(L·M)+z' wherein, 'L' is the distance between the microlens array 3 and the head-up-display 21 and 'z' is the distance between a predefined position for the eye of a viewer 27 and the head-up-display 21. 'L' is determined using the equation L=(Ze−z)/M and is typically between 1 to 500 mm. 'z' is preferably a predefined value and is typically between 500 to 1200 mm. A distance between 500 to 1200 mm is the typical distance between the eye of a driver of a car and the position of a head-up-display 21 in the car. 'M' is preferably a predefined value which is representative of the position of the virtual image 22; the position of the virtual image 22 can be changed by changing 'M'. Typically a predefined value of for 'M' is given by the manufacturer.

During manufacturing fixed predefined values for the Ze, z, M and L are given. The magnification of the head-up-display M is preferably in the range of 1 to 20. The focal length F of the of the focusing lens is preferably in the range 5 to 1000 mm, and for d: t and h are preferably in the range 0.1 to 100 mm, and n is preferably in the range 1 to 4, $\Theta_i$ is preferably in the range 0 to 89°, so that d is preferably in the range $9.5 \times 10^{-4}$ mm to 55 mm.

The manufacturer will position the planar reflector element 100 and the planar beam splitter element 90 to achieve suitable values for 'h', 'd' and will adjust the position of the microlens array 3 and/or the position of the image projector 2 and replace the focusing lens 11 with a focusing lens having a suitable focal length, so as to achieve a suitable value for so as to ensure that the optical assembly 20 has a numerical aperture which is larger than the numerical aperture of a viewer 27 who is viewing the virtual image 22, and such that the optical distance (OD) between the planar beam splitter element 90 and the planar reflector element 100 is greater than, or equal to, half the coherence length of the calumniated light beam 5. It is noted that if the position of the microlens array 3 and/or the position of the image projector 2 is moved then the focusing lens having a suitable focal length is a focusing lens which can be positioned between the image projector 2 and microlens array 3 at a distance from the microlens array which is equal to the focal length 'F' of the focusing lens.

For example, under normal illumination conditions the eye of a viewer 27 can measure 3 mm such that 'y=3 mm'. The virtual image 22 can be desired to be at a distance of 'Ze=2250 mm' from the viewer 27 because typically for a head-up-display in automotive application it is desired to have the virtual image project to just in front of the automobile, thus the numerical aperture of the viewer 27 is 0.00067. Typically 'M' is equal 6 for the system compactness. To obtain a good virtual image quality, the pixel density must be at least 60 pixel/degree. This implies a condition on the virtual image size and resolution. For example, the image can have a 720p resolution which means that the image has 1280×720 pixels. If the image is viewed from a distance of 2250 mm it must have a maximal dimension of 846×473 mm to have a minimum of 60 pixels/degree. With a magnification of 6 the image on the microlens array 3 measures 141×79 mm. Thus the position of the microlens array 3 and/or the focusing lens 11 can be adjusted, and/or the focusing lens 11 can be replaced with a focusing lens having a suitable focal length, to achieve a suitable dimension for F which ensures that an image on the microlens array 3 is generated which is smaller or equal to the dimension 141×79 mm, otherwise the quality of the virtual image 22 will be lowered. In practice it will depend on the full optical scanning angle of the MEMS mirror 6. It is always possible to obtain the right image size with a MEMS mirror projection system. If the image on the microlens array 3 is too small, one can replace the focusing lens 11 with a focusing lens with a suitable focal length, or move the image projector 2 further away from the microlens array 3 until the image dimension on the microlens array is small than or equal to the dimension 141×79 mm. Similarly if the if the image on the microlens array 3 is too large the focusing one can move the image projector 2 further away from the microlens array 3 and replace the focusing lens 11 with a focusing lens with a suitable focal length, until the image dimension on the microlens array is small than or equal to the dimension 141×79 mm. Once a value for 'F' is found which provides an image dimension on the microlens array 3 which is small than or equal to the dimension 141×79 mm, a suitable value for the thickness 't' of the planar beam splitter element 90 and a suitable value for the distance 'h' between the planar beam splitter element 90 and the reflector element 100 are then determined so that the 'OD' between the planar beam splitter element 90 and the planar reflector element 100 is greater than, or equal to, half the coherence length of the collimated light beam 5 and the numerical aperture of the optical assembly 20 is larger than the numerical aperture of the viewer 27. Typically, 'F=200 mm' such that 'd' must be larger or equal to 2×F×M× 0.00067=1.61 mm.

In this embodiment the space 13 between the planar beam splitter element 90 and planar reflector element 100 is occupied by an air and the collimated light beam 5 passes through air before it is incident on the planar beam splitter element 90 such that n1=n3=1, and the angle of incidence '$\Theta_i$' is 45°, and the beam splitter material is glass such that 'n=1.52', so that in this example the optical distance is defined as: 'OD=t/0.885+h/0.707'; suitable values for 't' and 'h' are chosen such that the optical distance (OD) between the planar beam splitter element 90 and the planar reflector element 100 is greater than, or equal to, half the coherence length of the collimated light beam 5 which for example in the case of a red diode laser can be 1 mm. From these numbers, one can adjust the dimension for 't' and 'h' in the optical assembly 20 such that 'OD' of the optical assembly 20 is at least 1 mm and 'd' is at least 1.61 mm.

Advantageously, in this optical assembly 20 embodiment illustrated in FIG. 2, because the planar beam splitter element 90 and planar reflector element 100 are arranged in parallel and have an optical distance greater than half the coherent length of the collimated light beam 5, its image projector 2 offers the same advantages of reduced speckle and reduced moiré patterns, as the image projector 2 of the optical assembly 1 shown in FIG. 1. Furthermore, since the optical assembly 20 is configured such that it has a numerical aperture which is larger than the numerical aperture of a viewer 27 who is viewing the virtual image 22, the speckle patterns created by each of the multiple independent light beams 15a-c are de-correlated from each other; this results in a further reduction in speckle.

Furthermore since, in this optical assembly 20 the distance 'd' between two consecutive (i.e. two neighbouring) multiple beams 15a-c output from the multiple beam generator 8 measured prior to being incident on the focusing lens 11 and is equal to:

$$d = 2(t \tan \theta_2 + h \tan \theta_3) \cos \theta_i$$

a better reduction in moiré is achieved because this condition for 'd' ensures that the maxima of the interference pattern of at least one of the multiple light beams 15a-c more precisely overlays the minima of the interference pattern of at least one other of the multiple light beams 15a-c, and vice versa; in practice there will be many multiple light beams 15a-c and many more precise overlays of maxima and minima of the interference patterns for different light beams.

In the embodiment in which 'd' satisfies the following equation:

$$d = F\tan\left[(2k+1)\frac{\theta_p}{2}\right]$$

wherein $\Theta_p$ equal to:

$$\theta_p = \frac{\lambda}{P}$$

wherein $\lambda$ is the wavelength of the collimated light beam 5 and 'P' is the pitch of the microlens array 3 which is the distance from the center of a microlens in the microlens array 3 to the center of its neighbouring microlens, k is an integer defining the order of the multiple beam generator 8, and $\theta_p$ is the angular separation between the interference maxima of one of the multiple light beams 15a-c, then advantageously a further reduction in moiré is achieved.

Figure 3:
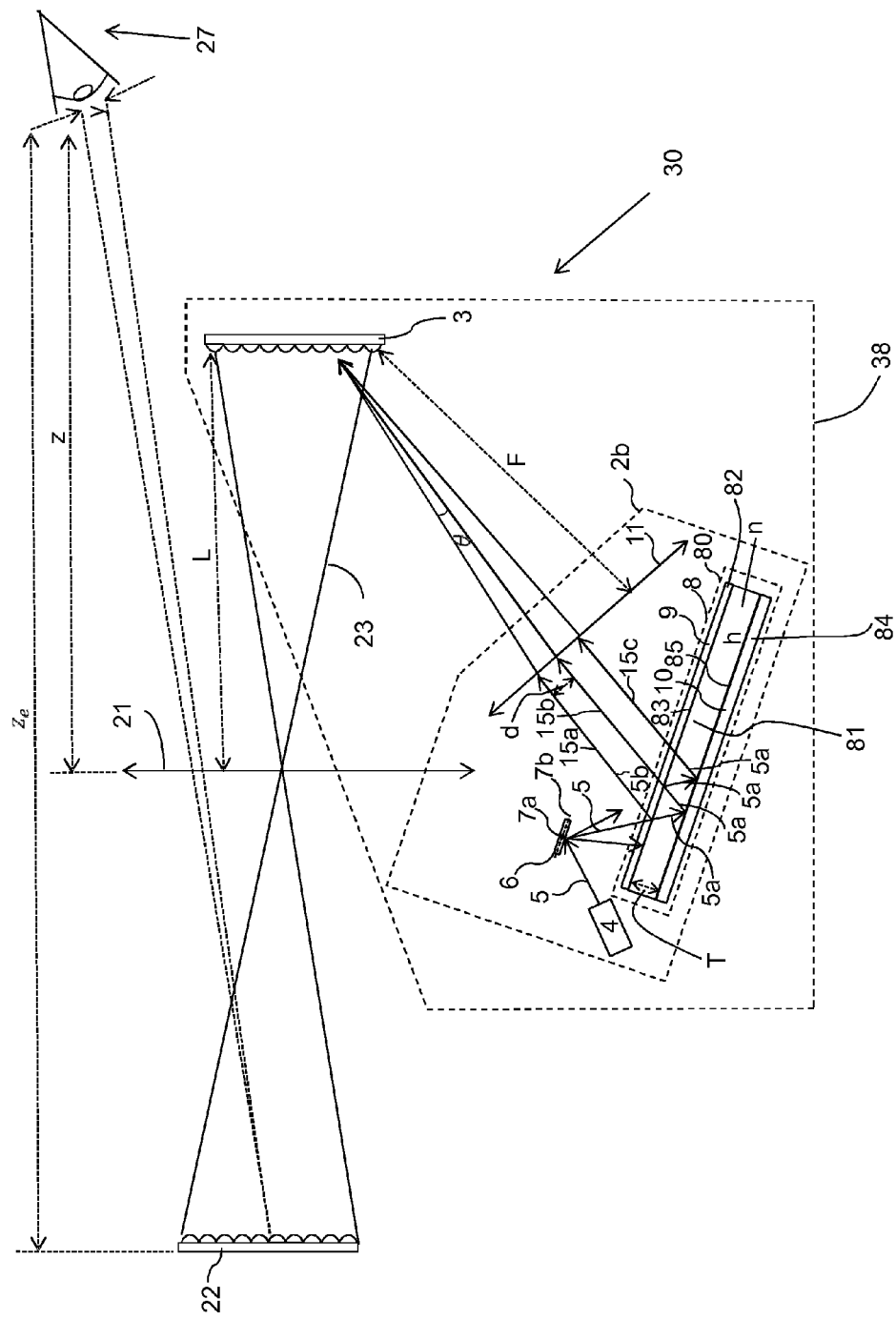
FIG. 3 shows a perspective view of an optical assembly according to a further embodiment of the present invention.

FIG. 3 shows a perspective view of an optical assembly 30 according to a further embodiment of the present invention. The optical assembly 30 shown in FIG. 3 has many of the same features of the optical assembly 20 shown in FIG. 2 and like features are awarded the same reference numbers.

However in contrast the embodiment illustrated in FIG. 2, the optical assembly 30 comprises an image projector 2b according to a further embodiment of the present invention, which comprises a multiple beam generator 80 having a glass block 81 between the planar beam splitter 9 and the planar reflector 10 (It will be understood that the invention is not limited to requiring a glass block; it will be understood that any suitable optically transparent material may be used in the multiple beam generator 80). A planar beam splitter coating 82 is provided on one surface 83 of the glass block 81 and a planar reflective coating 84 is provided on a second, opposite surface 85 of the glass block. The planar beam splitter coating 82 may comprise a semi-reflective material and the planar reflective coating 84 may comprise reflective material. The opposing surfaces 83,85 of the glass block are flat and are parallel to one another so that the planar beam splitter coating 82 and planar reflective coating 84 are parallel and planar. In this embodiment the planar beam splitter coating 82 defines the planar beam splitter 9 and the planar reflective coating 84 defines the planar reflector 10, and the optical distance between the planar beam splitter 9 (planar beam splitter coating 82) and the planar reflector 10 (planar reflective coating 84) is defined by:

$$OD = \frac{h}{\cos(\theta_2)}$$

wherein 'h' is the distance between the planar beam splitter coating 82 and planar reflective coating 84 (i.e. the thickness 'T' of the block of the glass block 81) and $\Theta_2$ is $$\theta_2 = \sin^{-1}\left(\frac{n_1 \sin \theta_i}{n}\right)$$

wherein '$\Theta_i$' is the incidence (AOI) of the collimated beam 5 (preferably the central beam) on the planar beam splitter coating 82, 'n1' is the refractive index of the material in which the collimated beam 5 passes before it is incident on the planar beam splitter element 9 (e.g. in this example the material in which the collimated beam passes before it is incident on the planar beam splitter 9 is air so 'n1' is equal to the refractive index 'air'), 'n' is the refractive index of the planar beam splitter coating 82.

In this example the distance 'h' between planar beam splitter coating 82 and planar reflective coating 84 is equal to:

$$h = \frac{d}{2\tan\left[\sin^{-1}\left(\frac{\sin \theta_i}{n}\right)\right]\cos \theta_i}$$

wherein 'd' is the distance 'd' between two consecutive (i.e. two neighbouring) multiple beams (e.g. 15a and 15b, or, 15b and 15c) output from the multiple beam generator 80 prior to two consecutive multiple beams being incident on the focusing lens 11, '$\Theta_i$' is the incidence (AOI) of the collimated beam 5 (preferably the central beam) on the planar beam splitter coating 82, 'n' is the refractive index of the material the glass block 81.

For example a manufacturer of the optical assembly 30 may choose a glass block having a suitable thickness 'T' such that the condition for 'h' mentioned above is met.

When this condition for 'h' is met a better reduction in moiré is achieved because the maxima of the interference pattern of at least one of the multiple light beams 15a-c more precisely overlays the minima of the interference pattern of at least one other of the multiple light beams 15a-c, and vice versa; in practice there will be many multiple light beams 15a-c and many more precise overlays of maxima and minima of the interference patterns for different light beams.

The optical-assembly 30 is configured such that it has a numerical aperture which is larger than the numerical aperture of a viewer 27 who is viewing the virtual image 22. Preferably the optical assembly 30 is configured such that it has a numerical aperture which is greater than a predefined numerical aperture value which represents the numerical aperture of a viewer; the predefined numerical aperture value is usually 0.016. 0.016 is the largest numerical aperture of a viewer having a pupil size between 1 to 10 mm for a virtual image position which is greater than, or equal to, 300 mm from the viewer.

The numerical aperture of the optical assembly 30 is defined as:

$(d/2)/(F \cdot M)$ wherein M is the magnification of the head-up-display 21 and F is the focal length of the of the focusing lens 11, and 'd' is the distance between two consecutive (i.e. two neighbouring) multiple beams 15a-c output from the multiple beam generator 8 measured prior to being incident on the focusing lens 11 and is given by the equation The optical assembly 30 is configured such that the distance 'd' between two consecutive (i.e. two neighbouring) multiple beams (e.g. 15a and 15b, or, 15b and 15c) output from the multiple beam generator 80 measured prior to being incident on the focusing lens 11 is equal to:

$$d = 2h\tan\left[\sin^{-1}\left(\frac{\sin \theta_i}{n}\right)\right]\cos \theta_i$$

wherein 'n' is the refractive index of glass block 81, $\Theta_i$ is the angle of incidence of the collimated light beam 5 on the planar beam splitter coating 82 (typically $\Theta_i$ taken to be the angle of incidence of central beam on the beam splitter coating 82), and 'h' is the distance between the planar beam splitter coating 82 and planar reflective coating 84 (i.e. 'h' is equal to the thickness 'T' of the glass block 81).

In a more preferred variation of the embodiment shown in FIG. 3, the optical assembly 30 is configured such that the distance 'd' between two consecutive (i.e. two neighbouring) multiple beams (e.g. 15a and 15b, or, 15b and 15c) output from the multiple beam generator 80 measured prior to being incident on the focusing lens 11 is equal to:

$$d = F \tan\left[(2k+1)\frac{\theta_P}{2}\right]$$

wherein $\Theta_p$ equal to:

$$\theta_p = \frac{\lambda}{P}$$

wherein λ is the wavelength of the collimated light beam 5 and 'P' is the pitch of the microlens array 3 which is the distance from the center of a microlens in the microlens array 3 to the center of its neighbouring microlens, k is an integer defining the order of the multiple beam generator 80, and $\Theta_p$ is the angular separation between the interference maxima (or minima) of one of the multiple light beams 15a-c; this means that successive interference maxima of the first light beam 15a will occur at $0\Theta_p$, $1\Theta_p$, $2\Theta_p$, $3\Theta_p$ . . . etc. In order for the maxima of the interference pattern another one of the multiple light beams 15a-c (e.g. second light beam 15b) to overlay the minima of the interference pattern of the first light beam 15a, its maxima of the interference pattern must fit between two successive maxima of the interference pattern of the first light beam 15a; accordingly the maxima of the interference pattern of the second light beam 15b must occur at $\Theta=\Theta_p/2$, $1.5\Theta_p$, $2.5\Theta_p$, $3.5\Theta_p$ . . . etc.

Thus, the calculation of 'd' using the condition $\Theta=\Theta_p/2$, $1.5\Theta_p$, $2.5\Theta_p$, $3.5\Theta_p$ . . . etc. gives:

$$d = F \tan(\Theta) = F \tan(\Theta_p/2)$$

Because the interference are periodic, this equation is also true for every odd integer (2k+1) multiple such as:

$$d = F \tan[(2k+1)\Theta_p/2]$$

When the optical assembly 30 is configured such that 'd' satisfies this condition a further reduction in moiré is achieved.

The angle of incidence (AOI), '$\Theta_i$', of the collimated light beam 5 on the beam splitter coating 82 is the angle between the collimated light beam 5 and the normal vector to the planar beam splitter coating 82. Preferably the AOI is the angle between a central beam of the collimated light beam 5 and the normal vector to the planar beam splitter coating 82 wherein the central beam of the collimated light beam 5 is the beam reflected towards the planar beam splitter coating 82 when the MEMS mirror 6 is at rest.

For example, one could consider the AOI of the central beam to find suitable dimensions for 'h' (i.e. to find a suitable dimension for the thickness of the glass block 81) when designing or manufacturing the optical assembly 20 so that such that 'OD' between planar beam splitter coating 82 and planar reflective coating 84 is greater than, or equal to, half the coherence length of the collimated light beam 5 and such that the numerical aperture of the optical assembly 20 (i.e. (d/2)/(FM)) is larger than the numerical aperture of the viewer 27:

The central beam is found by measuring the angle between the collimated beam 5 projected on the beam splitter 9 when the MEMS mirror is at rest and the normal to the surface 83 of the beam splitter element 9. The refractive index of the planar beam splitter is a known value typically given from material datasheet. Suitable dimensions for 'h' are then chosen such that 'OD' between the planar beam splitter coating 82 and the planar reflective coating 84 is greater than, or equal to, half the coherence length of the collimated light beam 5 and such that the numerical aperture of the optical assembly 30 (i.e. (d/2)/(FM)) is larger than the numerical aperture of the viewer 27.

The numerical aperture of the viewer 27 is defined by (y/2)/(Ze) wherein y is the pupil size of the viewer 27, and Ze is a distance from a predefined position where the optical assembly 30 projects a virtual image 22 to a predefined position where a viewer will view the virtual image 22. The pupil size depends of each viewer physiognomy and ambient light conditions and may vary between 1 to 10 mm in size. The position of the virtual image 22 is preferably a predefined value and it is equal to 'Ze=(L·M)+z' wherein, 'L' is the distance between the microlens array 3 and the head-up-display 21 and 'z' is the distance between a predefined position for the eye of a viewer 27 and the head-up-display 21. 'L' is determined using the equation L=(Ze−z)/M and is typically between 1 to 500 mm. 'z' is preferably a predefined value and is typically between 500 to 1200 mm. A distance between 500 to 1200 mm is the typical distance between the eye of a driver of a car and the position of a head-up-display 21 in the car. 'M' is preferably a predefined value which is representative of the position of the virtual image 22; the position of the virtual image 22 can be changed by changing 'M'. Typically a predefined value of for 'M' is given by the manufacturer.

During manufacturing fixed predefined values for the Ze, z, M and L are given. The magnification of the head-up-display M is preferably in the range of 1 to 20. The focal length F of the of the focusing lens is preferably in the range 5 to 1000 mm, and for d: h is preferably in the range 0.1 to 100 mm, and n is preferably in the range 1 to 4, $\Theta_i$ is preferably in the range 0 to 89°, so that d is preferably in the range $9.5 \times 10^{-4}$ mm to 55 mm.

The manufacturer of the optical assembly 30 may choose a glass block having a suitable thickness 'T' such that the condition for 'h' mentioned above is met and will adjust the position of the microlens array 3 and/or the projector 2 and replace the focusing lens 11 with a focusing lens having a suitable focal length, to achieve a suitable value for 'F', so as to ensure that the optical assembly 30, is configured such that it has a numerical aperture which is larger than the numerical aperture of a viewer 27 who is viewing the virtual image 22, and such that optical distance between the planar beam splitter coating 82 and the planar reflective coating 84 is greater than, or equal to, half the coherence length of the calumniated light beam 5.

For example, under normal illumination conditions the eye of a viewer 27 can measure 3 mm such that 'y=3 mm'. The virtual image 22 can be desired to be at a distance of 'Ze=2250 mm' from the viewer 27 because typically for a head-up-display in automotive application it is desired to have the virtual image project to just in front of the automobile, thus the numerical aperture of the viewer 27 is 0.00067. Typically 'M' is equal 6 for the system compactness. To obtain a good virtual image quality, the pixel density must be at least 60 pixel/degree. This implies a condition on the virtual image size and resolution. For example, the image can have a 720p resolution which means that the image has 1280×720 pixels. If the image is viewed from a distance of 2250 mm it must have a maximal dimension of 846×473 mm to have a minimum of 60 pixels/degree. With a magnification of 6 the image on the microlens array 3 measures 141×79 mm. Thus the position of the microlens array 3 and/or the focusing lens 11 can be adjusted, and/or the focusing lens 11 can be replaced with a focusing lens having a suitable focal length, to achieve a suitable dimension for F which ensures that an image on the microlens array 3 is generated which is smaller or equal to the dimension 141×79 mm, otherwise the quality of the virtual image 22 will be lowered. In practice it will depend on the full optical scanning angle of the MEMS mirror 6. It is always possible to obtain the right image size with a MEMS mirror projection system. If the image on the microlens array 3 is too small, one can replace the focusing lens 11 with a focusing lens with a suitable focal length, or move the image projector 2b further away from the microlens array 3 until the image dimension on the microlens array is small than or equal to the dimension 141×79 mm. Similarly if the if the image on the microlens array 3 is too large the focusing one can move the image projector 2 further away from the microlens array 3 and replace the focusing lens 11 with a focusing lens with a suitable focal length, until the image dimension on the microlens array is small than or equal to the dimension 141×79 mm. Once a value for 'F' is found which provides an image dimension on the microlens array 3 which is small than or equal to the dimension 141×79 mm, a suitable value for the distance 'h' between the planar beam splitter coating 82 and the planar reflective coating 84 are then determined so that the 'OD' between the planar beam splitter coating 82 and the planar reflective coating 84 is greater than, or equal to, half the coherence length of the collimated light beam 5 and the numerical aperture of the optical assembly 30 is larger than the numerical aperture of the viewer 27. Typically, 'F=200 mm' such that 'd' must be larger or equal to 2×F×M×0.00067=1.61 mm.

In this embodiment the space 81 between the planar beam splitter coating 82 and planar reflective coating 84 is occupied by glass and the collimated light beam 5 passes through air before it is incident on the planar beam splitter coating 82 such that n1=1, and the angle of incidence '$\Theta_i$' is 45°, and the beam splitter material is glass such that 'n=1.52', so that in this example the optical distance is defined as: 'OD=h/0.707'; suitable values for 'h' is chosen such that the optical distance (OD) between the planar beam splitter coating 82 and the planar reflecting coating 84 is greater than, or equal to, half the coherence length of the collimated light beam 5 which for example in the case of a red diode laser can be 1 mm. From these numbers, one can adjust the dimension for 'h' in the optical assembly 30 such that 'OD' of the optical assembly 30 is at least 1 mm and 'd' is at least 1.61 mm.

Advantageously, in this embodiment illustrated in FIG. 3, because the planar beam splitter coating 82 and planar reflective coating 84 are arranged in parallel and have an optical distance greater than half the coherent length of the collimated light beam 5, its image projector 2b offers the same advantages of reduced speckle and reduced moiré patterns, as the image projector 2 of the optical assembly 1 shown in FIG. 1. Furthermore, since the optical assembly 30 is configured such that it has a numerical aperture which is larger than the numerical aperture of a viewer 27 who is viewing the virtual image 22, the speckle patterns created by each of the multiple independent light beams 15a-c are de-correlated from each other; this results in a further reduction in speckle.

Furthermore since, in this optical assembly 30 the distance 'h' between planar beam splitter coating 82 and planar reflective coating 84 is equal to:

$$h = \frac{d}{2\tan\left[\sin^{-1}\left(\frac{\sin\theta_i}{n}\right)\right]\cos\theta_i}$$

the optical assembly 30 can achieve an improved reduction in moiré is achieved because this condition for 'h' ensures that the maxima of the interference pattern of at least one of the multiple light beams 15a-c more precisely overlays the minima of the interference pattern of at least one other of the multiple light beams 15a-c, and vice versa; in practice there will be many multiple light beams 15a-c and many more precise overlays of maxima and minima of the interference patterns for different light beams.

Additionally an further more precise overlays of maxima and minima of the interference patterns of multiple light beams 15a-c is achieved when the optical assembly 30 is configured such that 'd' satisfies the condition:

$$d = F\tan\left[(2k+1)\frac{\theta_P}{2}\right]$$

In the most preferred embodiment 'h' is equal to 5.12 mm. This provides the optimum moiré reduction when the multiple light beams 15a-c are blue, green and red light beams respectively; and which each have an angle of incidence $\Theta_i$ of 45°; and which has respective wavelength values
$\lambda_{blue}$=0.438 µm
$\lambda_{green}$=0.520 µm
$\lambda_{red}$=0.638 µm
and respective k values,
$k_{blue}$=6
$k_{green}$=5
$k_{red}$=4
And respective n values:
$n_{blue}$=1.47
$n_{green}$=1.46
$n_{red}$=1.46

Figure 7:
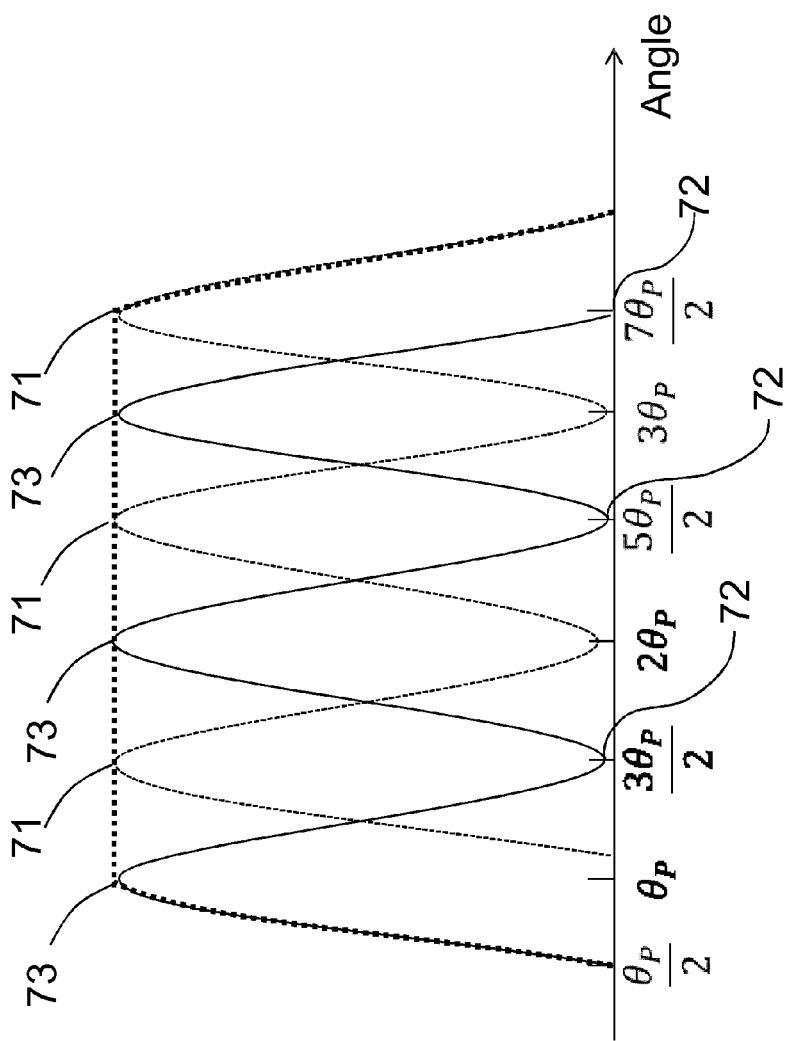
FIG. 7 illustrates the maxima of the interference pattern of a light beam overlaying the minima of the interference pattern of another light beam.

FIG. 7 illustrates how the moiré reduction is achieved in the embodiments shown in FIGS. 2 and 3. FIG. 7 illustrates the maxima 71 of the interference pattern of the second light beam 15b overlaying the minima 72 of the interference pattern of the first light beam 15a, and the maxima 73 of the interference pattern of the first light beam 15b overlaying the minima (not visible in figure) of the interference pattern of the second light beam 15b.

Figure 4:
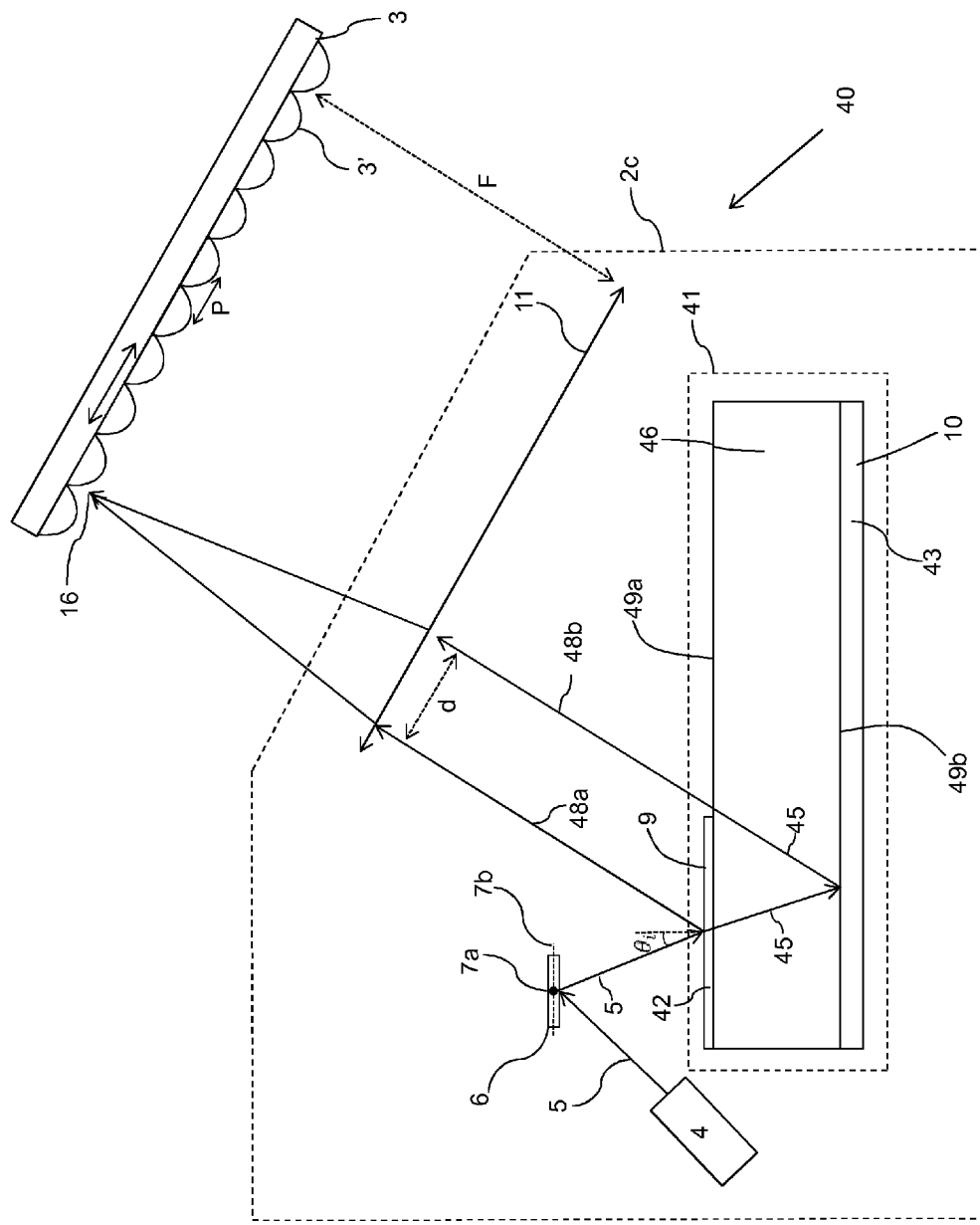
FIG. 4 shows a plan view of an optical assembly according to an embodiment of the present invention.

FIG. 4 shows a plan view of an optical assembly 40 according to a further embodiment of the present invention. The optical assembly 40 shown in FIG. 4 has many of the same features as the optical assembly 1 shown in FIG. 1 and like features are awarded the same reference numbers. It will be understood that the optical assembly 40 could have any one or more of the features or conditions of the optical assemblies 20,30 shown in FIGS. 2 and 3.

In contrast the optical assembly shown in FIG. 1 the optical assembly 40 according to a further embodiment of the present invention which comprises an image projector 2c according to a further embodiment of the present invention, which has a multiple beam generator 41 which comprises a glass block 46 (It will be understood that the invention is not limited to requiring a glass block 46; it will be understood that any suitable optically transparent material may be used in the multiple beam generator 41). A planar beam splitter 9, in the form of a planar beam splitter coating 42 (which may comprise semi-reflective material), is provided on one surface 49a of the glass block 81, and a planar reflector 10, in the form of a planar reflective coating 43 (which may comprise reflective material), is provided on a second, opposite surface 49b of the glass block 46. In this embodiment the planar beam splitter coating 42 defines the planar beam splitter 9 and the planar reflective coating 43 defines the planar beam reflector 10. The first and second surfaces 49a,b are flat and are parallel to one another so that the planar beam splitter coating 42 and planar reflective coating 43 are parallel and planar.

Importantly the planar beam splitter coating 42 is configured such that light 45 reflected from the planar reflector coating 43 passes directly from the planar reflector coating 43 to the focusing lens 11 without passing through the planar beam splitter 42. This can be achieved by positioning the planar beam splitter coating 42 on only a portion of the first surface 49a of the glass block 46 so that the planar beam splitter coating 42 does not overlay the whole of the planar reflector coating 43 and/or by providing a planar beam splitter coating 42 which has a smaller perimeter than the perimeter of the planar reflector coating 43 so that the planar beam splitter coating 42 does not overlay the whole of the planar reflector coating 43. In this embodiment illustrated in FIG. 4 the planar beam splitter coating 42 is provided on only a portion of the first surface 49a of the glass block 46 so that the planar beam splitter coating 42 does not overlay the whole of the planar reflector coating 43. Collimated light beam 45 which passes through the planar beam splitter coating 42 is thus reflected by the planar reflector coating 43 directly to the focusing lens 11 without passing through the planar beam splitter coating 42. The multiple beam splitter 41 comprises a glass block 46 and a planar beam splitter coating 42 on one surface of the glass block 46 defines the planar beam splitter coating 42, while a planar reflective coating 43 provides on an opposite surface of the glass block 46 defines the planar reflector 43.

Advantageously, because the light beams reflected 45 by the planar reflector 43 are passed directly from the planar reflector 43 to the focusing lens 11 without passing through the planar beam splitter 42 only two beams 48a,48b are generated by the multiple beam splitter 41 from a single collimated light beam 45 and these two beams 48a,b have similar optical power. When these two beams 48a,b are focused to the same point 16 on the microlens array 3 by the focusing lens 11 each of the two beams 48a,b will produce an interference pattern of the same intensity and which are angularly shifted with respect to one another such as the maxima of the interference pattern of one of the light beams 48a are located at the minima of the interference pattern of the other light beam 48b; because the two beams 48a,b have the same optical power the interference patterns will average out perfectly to obtain a constant optical power image with reduced moiré.

It will be understood that in a variation of the embodiment shown in FIG. 4, no glass block is provided in the multiple beam generator; rather the multiple beam generator may simply take the form of the multiple beam generator 8 of the image projector 2 of the optical assembly 1 shown in FIG. 1, which comprises a planar beam splitter element 90 and planar reflector element 100 as mechanically independent structures separated by an air gap 13. In this variation the planar beam splitter element 90 and planar reflector element 100 may be simply position so that the planar beam splitter element 90 does not overlay the planar reflector element 100 completely; or the planar beam splitter element 90 could be dimensioned to have a perimeter which is smaller than the perimeter of the planar reflector element 100 so that the planar beam splitter element 90 does not overlay the planar reflector element 100 completely; thereby allowing light 45 reflected from the planar reflector element 100 to pass directly from the planar reflector element 100 to the focusing lens 11 without passing through the planar beam splitter element 90.

Figure 6:
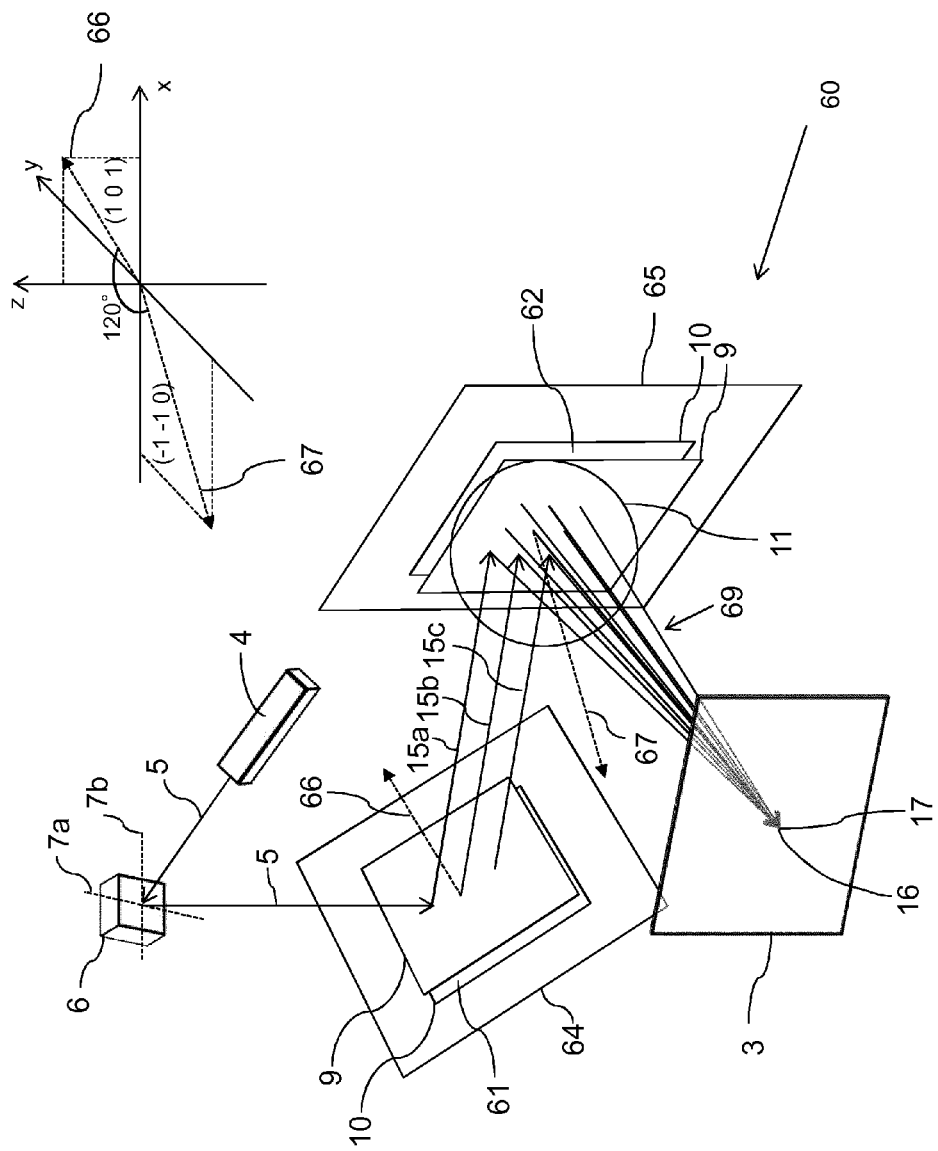
FIG. 6 provides a perspective view of an optical assembly according to a further embodiment of the present invention.

FIG. 6 illustrates an optical assembly 60 according to further embodiment of the present invention. The optical assembly 60 contains many of the same features of the optical assemblies (1,20,30,40) shown in FIGS. 1-4 and like features are awarded the same reference numbers. It will be understood that the optical assembly 60 could contain any of the features of the embodiments illustrated in FIGS. 1-4.

Unlike the other embodiments the optical assembly 60 comprises a plurality of multiple-beam-generators 61,62, which are arranged to be in optical communication with one-another. Each of the multiple-beam-generators 61,62 may comprise one or more of the features of the multiple-beam-generators 8,41,80 illustrated in the any of the other optical assembly embodiments already described.

Each of the plurality of multiple-beam-generators have a different orientation such that they each lie on, or are parallel to, differently orientated planes 64,65. In this example the planar beam splitter 9 and planar reflector 10 of the multiple beam generator 61 lie on, or are parallel to, a first plane 64 and the planar beam splitter 9 and planar reflector 10 of the multiple beam generator 62 lie on, or are parallel to, a second plane 65. The first plane 64 and second plane 65 are orientated such that there is an angle of 120° between the planes 64,65. Preferably the first plane 64 of the multiple beam generator 61 is orientated along the (1 0 1) and the second plane 65 of the multiple beam generator 62 is orientated along the (−1 −1 0). Then the angle between the two planes is 120°. The orientation of a plane is defined by a vector (x y z) which is normal to the plane. The first plane 64 is orientated perpendicular to the (1 0 1) vector 66 while the second plane 65 is orientated perpendicular to the (−1 −1 0) vector 67.

It will be understood that while the optical assembly 60 illustrates only two multiple-beam-generators 61,62 which lie on different planes 64,65 any number of multiple-beam-generators could be provided in the optical assembly 60, each multiple-beam-generator being in optical communication with another multiple-beam-generator and the planar beam splitter 9 and planar reflector 10 of each of the multiple beam generators lying on, or being parallel to, differently orientated planes.

Advantageously because the optical assembly 60 comprises two multiple beam generators 61,62 which are in optical communication and which lie on, or are parallel to, differently orientated planes 64,65 this enables a further reduction in speckle and moiré to be achieved because a 2D array 69 of multiple beams is created when using two multiple beam generators 61,62. Each of the multiple beams in the 2D multiple beam array 69 are focused by the focusing lens 11 to the same point 16 on the microlens array 3 to define a single pixel 17. Multiple speckle patterns or moiré patterns are then created at point 16 such as they average out in 2D providing improved speckle and moiré reduction.

Each pixel of the projected image is projected in this manner so that there is a reduction in speckle and moiré over the whole of the projected image.

As mentioned in the embodiment illustrated in FIG. 1 the sizes of the microlens' 3' in the microlens array 3 are all equal, however in a variation of the invention the microlens array 3 could be configured to have different sized microlens as shown in FIG. 5a. FIG. 5a shows a perspective view of an alternative configuration for the screen 3 which can be used in any of the embodiments of the present invention. FIG. 5a illustrates a screen 3 in the form of a microlens array 50 which comprises differently sized microlens 51. Accordingly in the microlens array 50 the pitch 'P' between the microlens' 51 in the microlens array 50 differs across the microlens array 50. More precisely in this example the sizes of the microlens' 51 in the microlens array 50 increase from a centre column 53 of microlens towards the outermost column 54 of microlens of the microlens array 51. The size of the microlens along each respective column 53,54 are equal; however in a variation of the embodiment the size of the microlens along each respective column 53,54 may increase or decrease.

In a further variation of the embodiment the sizes of the microlens' 51 in the microlens array 50 can increase from a centre row 56 of microlens towards the outermost row of microlens 57 of the microlens array 51. The size of the microlens along each respective row 56,57 may be equal; however in a further variation of the invention the size of the microlens along each respective row 56,57 may increase or decrease.

Specifically the size of the microlens' 51 in the microlens array 50 is such that the pitch between consecutive microlens 51, is equal to:

$$(P_{eff}/\cos \Theta_{scan})$$

wherein $P_{eff}$ is a predefined effective pitch value and $\Theta_{scan}$ is the angle of incidence of a light beam emitted from the projector device on that microlens 51. The 'effective pitch' is the projection of the pitch of the microlens along the incoming light direction $\Theta_{scan}$.

FIG. 5b illustrates the problem which arises with microlens arrays in which all microlens of the microlens array are of equal size: As the light beam is scanned across the microlens array, the angle of incidence of the light beam on microlens array will change over the scan amplitude; as the light beam is scanned towards the outermost microlens' in the angle of incidence will be reduced so that light beam experiences an 'effective pitch' which is lower than the physical distance between the centres of neighbouring microlens; this can result in a changing interference pattern along the scanning amplitude (wherein the scanning amplitude is the amplitude over which the oscillating MEMS mirror 6 scans the collimated light beam 5). Because the angle between two maxima of the interference pattern is defined by $\Theta_p = \lambda/P$, as the scanning amplitude increases, the 'effective pitch' becomes smaller, thus $\Theta_p$ becomes larger and the calculated thickness of the MBG is not optimal to average out perfectly the interference patterns. Advantageously the microlens array shown in FIG. 5a resolves this problem; since the microlens' are sized such that the pitch between consecutive microlens 51 is equal to $(P_{eff}/\cos \Theta_{scan})$ it compensates for the scanning of the light beam by the MEMS mirror 6 so that 'effective pitch' experienced by the light beam is equal across the whole scanning amplitude.

In a further variation of the microlens array 50 shown in FIG. 5; the microlens 51 in the microlens array may be further sized such that they compensate for the change in angle of incidence of the collimated light 5 beam on the planar beam splitter 9, which occurs when the collimated light beam 5 is scanned by the oscillating MEMS mirror 6. In this case the optical assembly will preferably take the form of the optical assembly 30 shown in FIG. 3 and the optical assembly 30 will be configured such that the distance 'h' between the planar beam splitter 9 (beam splitter coating 82) and the planar reflector 10 (reflective coating 84)) is given by:

$$h = \frac{d}{2\tan\left[\sin^{-1}\left(\frac{\sin\theta_i}{n}\right)\right]\cos\theta_i}$$

The thickness 'T' of the glass block 81 between the beam splitter coating 82 and the reflective coating 84 defines the distance 'h' between the planar beam splitter 9 (beam splitter coating 82) and the planar reflector 10 (reflective coating 84)), thus the optical assembly 30 is configured such that the above mentioned condition for 'h' is met by choosing a glass block 81 with the appropriate thickness.

The optical assembly 30 is configured such that the distance 'd' between two consecutive (i.e. two neighbouring) multiple beams 15a-c output from the multiple beam generator 80 measured prior to being incident on the focusing lens 11 is:

$$d = F\tan\left[(2k+1)\frac{\theta_P}{2}\right].$$

The optical assembly 30 is configured such that the above conditions for 'h' and 'd' are met for the 'central beam'. As the amplitude of the scanning angle increases, $\Theta_i$ will change and the required value of 'h' to satisfy the condition on 'd' will thus change too. But it is difficult to have a changing thickness 'h' because the beam splitter and reflector should preferably be planar. In the present solution the variable $\Theta_p = \lambda/P$ is changed over the canning angle by having a microlens array which has an increasing pitch between the microlens, such as the condition on 'd' is constant with the change in input angle $\Theta_i$. Preferably pitch P between the microlens in the microlens array 50 should preferably vary according to the following equation:

$$P = \frac{(2k+1)\lambda}{2\tan^{-1}\left\{\frac{2h}{F}\tan\left[\sin^{-1}\left(\frac{\sin\theta_i}{n}\right)\right]\cos\theta_i\right\}}$$

wherein all the variables of this equation are fixed by the design of the optical assembly 30 and $\Theta_i$ varies with the scanning of the MEMS mirror 6.

It will be understood that although the screen 3 shown in FIG. 5a is in the form of a microlens array 50, the screen 3 could alternatively be in the form of a micromirror array having the same pitch conditions between consecutive micromirrors as those described above for the microlens array 50. It will also be understood that any of the above described optical assemblies could have a screen 3 in the form shown in FIG. 5a. Also it will be understood that the screen 3 may alternatively comprise a micromirror array and similarly the pitch between consecutive micromirror in the micromirror array may be equal to ($P_{eff}$/cos $\Theta_{scan}$).

Furthermore, it will be understood that in each of the above-mentioned image projector 2,2b,2c and/or optical assembly embodiments 1,20,30,40,60 the focusing lens 11 may take any suitable form; for example the focusing lens 11 may be a simple converging lens, a plano convex lens, double convex lens or a F-theta lens. Additionally, or alternatively, the focusing lens 11 may be further configured to correct chromatic aberration; for example the focusing lens 11 may be an achromatic lens such as an achromatic doublet or lens with a surface grating which is configured to correct chromatic aberration.

In each of the above mentioned image projector 2,2b,2c and/or optical assembly embodiments 1,20,30,40,60 the a light source 4 may be configured to emit collimated light beams 5 in pulses, each pulse of light defining a single pixel of a projected image. Each pulse may comprise the amount of red, green and blue light beams necessary for defining a corresponding pixel of the projected image; thus in this case the red, green and blue light beams are emitted by the light source simultaneously in the same pulse. One problem which may arise by having the red, green and blue light beams in the same pulse is that each of the red, green and blue light beams are incident on the same position on the focusing lens 11; as a result due to chromatic aberration the red, green and blue light beams will be focused to different points on the screen 3 thus compromising the resolution of the projected pixel.

To obviate or mitigate this problem the light source 4 may be configured to emit pulses of green, red and blue light beams consecutively in independent pulses, rather than emitting them simultaneously in the same pulse. Preferably the time of the emission of the green, red and blue light beams is synchronized with the orientation of the oscillating MEMS mirror 6 so that the red, green and blue light beams are incident at predefined respective positions on the focusing lens 11. The predefined respective positions are such that the red, green and blue light beams are focused to same point on the screen 3 by the focusing lens 11.

The chromatic aberration of the focusing lens 11 is a known value; typically known from the lens manufacturer or it can be calculated using well known equations in optics; it can also be measured using a detector placed after the focusing lens 11. Thus, the chromatic aberration is known for each pixel of a projected image. The optical assembly can also include a position sensor which is configured to measure the position and the speed of oscillation the MEMS mirror 6 about its oscillation axes 7a,7b, so that the position and the speed of oscillation of the MEMS mirror 6 is known at all-times. Knowing the speed and the position of the MEMS mirror 6, and knowing the chromatic aberrations of the focusing lens 11 for each red, green and blue light beam, allows calculating the time of the emission of the green, red and blue light beams to compensate the chromatic aberration such that the green, red and blue light beams are focused to the same point on the screen 3 by the focusing lens 11:

For example, due to the effects of chromatic aberration the blue light portion of a pixel is offset by a fixed distance of 'x mm' with respect to the green light portion of a pixel at a given scanning angle α of the MEMS mirror. At this given scanning angle α, the speed of oscillation of the MEMS mirror 6 is 'ω' in degree/second and the scanned spot 16 moves on the screen 3 at a speed 'v' in mm/s. To compensate for the effects of chromatic aberration, the light source 4 is configured to emit independent pulses of blue, red and green light, consecutively, for each pixel to be projected; the red, green and blue pulses combine on the screen 3 to form an pixel. The amount of blue, red and green light in the each pulse is according to the amount of blue, red and green colour in the pixel to be projected. Importantly in present invention, when the MEMS mirror 6 is detected to be at its given scanning angle α, and oscillating at a speed of 'ω' in degree/second, the blue light pulse which is to define blue colour portion of the pixel is emitted at a time delay of 't=x/v' seconds after the green light pulse which is to define the green colour portion of the pixel such that the blue and green pulses are incident at the same position 16 on the screen 3 to form the pixel 17. A similar operation will be done for the emission of the red light pulse. 't' defines the time delay between consecutive red, green and blue pulses. The time delay of the emission of the green, red and blue light beams can vary for each position of the MEMS mirror 6 because the aberration and the speed of the MEMS mirror 6 also vary throughout the oscillation amplitude of the MEMS mirror 6 will vary. Thus the synchronization of the emission of the independent red, green and blue light beams from the light source 4 with the oscillation of the MEMS mirror, so that the red, green and blue light beams are incident on predefined respective points on the focusing lens 11 such that they are focused by the focusing lens 11 onto the same point on the screen 3, can be used to correct chromatic aberration.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. An image projector comprising:
a light source to provide a light beam;
a MEMS mirror arranged to receive the light beam and to reflect the light beam;
one or more multiple-beam-generators, each of the one or more multiple-beam-generators comprising:
  a planar beam splitter arranged to receive the light beam reflected by the MEMS mirror and transmit at least part of the light beam; and
  a planar reflector to receive the part of the light beam which is transmitted through the planar beam splitter to generate multiple beams, the planar beam splitter and the planar reflector arranged in parallel; and
a focusing lens arranged to receive the multiple beams generated by the one or more multiple-beam-generators, for each of the one or more multiple-beam-generators, the distance (h) between the planar beam splitter and planar reflector is such that the optical distance (OD) between the planar beam splitter and planar reflector is greater than, or equal to, half the coherent length of the light beam.

2. The image projector of claim 1, the MEMS mirror to oscillate about at least one oscillation axis to scan the light beam across the one or more multiple-beam generators.

3. The image projector of claim 1, the one or more multiple beam generators comprising a planar beam splitter element defining the planar beam splitter and a planar reflector element defining the planar reflector, the planer beam splitter element and the planar reflector element arranged in parallel and spaced apart such that there is an air-gap between the planar beam splitter element and the planar reflector element, wherein the optical distance (OD) is defined as:

$$OD = \frac{t}{\cos(\theta_2)} + \frac{h}{\cos\left[\sin^{-1}\left(\frac{n\sin\theta_2}{n_3}\right)\right]}$$

$$\theta_2 = \sin^{-1}\left(\frac{n_1\sin\theta_i}{n}\right)$$

wherein 't' is the thickness of the planar beam splitter element, '$\theta_i$' is the incidence angle of the light beam on the planar beam splitter element, 'n1' is the refractive index of the material in which the light beam passes before it is incident on the planar beam splitter element, 'n' is the refractive index of planar beam splitter element, 'h' is the distance between the planar beam splitter element and planar reflector element, 'n3' is the refractive index of the air in the air-gap.

4. The image projector of claim 1, the one or more multiple beam generators comprising:
 a block of transparent material having a first surface and a second surface opposite the first surface;
 a planar coating of semi-reflective material on the first surface, the planar coating of semi-reflective material defining the planar beam splitter; and
 a planar coating of reflective material on the second surface, the planar coating of reflective material defining the planar reflector, wherein the optical distance (OD) is defined as:

$$OD = \frac{h}{\cos(\theta_2)}$$

wherein h is this distance between the coating of semi-reflective material and the coating of reflective material, and $\theta_2$ is $$\theta_2 = \sin^{-1}\left(\frac{n_1\sin\theta_i}{n}\right)$$

wherein '$\theta_i$' is the incidence (AOI) of the light beam 5 on the planar coating of semi-reflective material (82), 'n1' is the refractive index of the material in which the light beam 5 passes before it is incident on planar coating of semi-reflective material, 'n' is the refractive index planar coating of semi-reflective material.

5. The image projector of claim 1, comprising a plurality of multiple-beam-generators arranged in optical communication, wherein the planar beam splitter and the planar beam reflector of each of the plurality of multiple-beam-generators lie on differently orientated planes.

6. The image projector of claim 1, the planar beam splitter configured to have a beam splitting ratio of 40% reflection to 60% transmission.

7. The image projector claim 1, the planar beam splitter arranged such that the part of the light beam to be transmitted through the planar beam splitter and reflected by the planar reflector passes directly to the focusing lens without passing back through the planar beam splitter.

8. An optical assembly comprising,
 an image projector comprising:
  a light source to provide a light beam;
  a MEMS mirror arranged to receive the light beam and to reflect the light beam;
  one or more multiple-beam-generators, each of the one or more multiple-beam-generators comprising:
   a planar beam splitter arranged to receive the light beam reflected by the MEMS mirror and transmit at least part of the light beam; and
   a planar reflector to receive the part of the light beam which is transmitted through the planar beam splitter to generate multiple beams, the planar beam splitter and the planar reflector arranged in parallel; and
  a focusing lens arranged to receive the multiple beams generated by the one or more multiple-beam-generators and transmit the light through the focusing lens, for each of the one or more multiple-beam-generators, the distance (h) between the planar beam splitter and planar reflector is such that the optical distance (OD) between the planar beam splitter and planar reflector is greater than, or equal to, half the coherent length of the light beam;
 a screen to receive light transmitted through the focusing lens and to diffuse the received light; and
 a head-up-display to receive light diffused by the screen.

9. The optical assembly of claim 8, comprising a numerical aperture which is greater than a predefined numerical aperture value representing the numerical aperture of a viewer, wherein the numerical aperture of the optical assembly is defined as (d/2)/(F·M), wherein M is the magnification of the head-up-display, and F is the focal length of the of the focusing lens 11, and d is the distance between two consecutive multiple light beams output from the multiple beam generator and prior to said multiple light beams being incident on the focusing lens.

10. The optical assembly of claim 9, the one or more multiple beam generators comprising a planar beam splitter element defining the planar beam splitter and a planar reflector element defining the planar reflector, the planer beam splitter element and the planar reflector element arranged in parallel and spaced apart such that there is an air-gap between the planar beam splitter element and the planar reflector element, wherein the optical distance (OD) is defined as:

$$OD = \frac{t}{\cos(\theta_2)} + \frac{h}{\cos\left[\sin^{-1}\left(\frac{n\sin\theta_2}{n_3}\right)\right]}$$

$$\theta_2 = \sin^{-1}\left(\frac{n_1\sin\theta_i}{n}\right)$$

wherein 't' is the thickness of the planar beam splitter element, '$\theta_i$' is the incidence angle of the light beam on the planar beam splitter element, 'n1' is the refractive index of the material in which the light beam passes before it is incident on the planar beam splitter element, 'n' is the refractive index of planar beam splitter element, 'h' is the distance between the planar beam splitter element and planar reflector element, 'n3' is the refractive index of the air in the air-gap, wherein 'd' satisfies the condition:

$$d = 2(t\tan\theta_2 + h\tan\theta_3)\cos\theta_i$$

$$\theta_2 = \sin^{-1}\left(\frac{n_1\sin\theta_i}{n}\right)$$

$$\theta_3 = \sin^{-1}\left(\frac{n_1\sin\theta_2}{n_3}\right)$$

wherein 't' is the thickness of the planar beam splitter element, '$\theta_i$' is the angle of incidence (AOI) of the light beam on the planar beam splitter element, 'n1' is the refractive index of the material in which the light beam passes before it is incident on the planar beam splitter element, 'n' is the refractive index of planar beam splitter element, 'h' is the distance between the planar beam splitter element and the planar reflector element, 'n3' is the refractive index of the material which occupies the space between planar beam splitter element and planar reflector element.

11. The optical assembly of claim 9, the one or more multiple beam generators comprising:
    a block of transparent material having a first surface and a second surface opposite the first surface;
    a planar coating of semi-reflective material on the first surface, the planar coating of semi-reflective material defining the planar beam splitter; and
    a planar coating of reflective material on the second surface, the planar coating of reflective material defining the planar reflector, wherein the optical distance (OD) is defined as:

$$OD = \frac{h}{\cos(\theta_2)}$$

wherein h is this distance between the coating of semi-reflective material and the coating of reflective material, and $\theta_2$ is $$\theta_2 = \sin^{-1}\left(\frac{n_1\sin\theta_i}{n}\right)$$

wherein '$\theta_i$' is the incidence (AOI) of the light beam 5 on the planar coating of semi-reflective material (82), 'n1' is the refractive index of the material in which the light beam 5 passes before it is incident on planar coating of semi-reflective material, 'n' is the refractive index planar coating of semi-reflective material, wherein 'd' satisfies the condition:

$$d = 2h\tan\left[\sin^{-1}\left(\frac{\sin\theta_i}{n}\right)\right]\cos\theta_i$$

wherein 'h' is the distance between the coating of semi-reflective material (82) and the coating of reflective material (84), n is the refractive index of the block of transparent material (46,81), $\theta_i$ is the angle of incidence of the light beam on the of semi-reflective material (82).

12. The optical assembly of claim 9, the screen comprising a microlens array, wherein 'd' satisfies the condition:

$$d = F\tan\left[(2k+1)\frac{\theta_P}{2}\right]$$

wherein F is the focal length of the of the focusing lens, k is an integer which is the order of the multiple-beam-generator, and $\theta_p$ is equal to:

$$\theta_P = \frac{\lambda}{P}$$

wherein $\lambda$ is the wavelength of the light beam and 'P' is the pitch of the microlens array.

13. The optical assembly of claim 11, wherein the distance 'h' between the planar beam splitter and the planar reflector satisfies the condition:

$$h = \frac{d}{2\tan\left[\sin^{-1}\left(\frac{\sin\theta_i}{n}\right)\right]\cos\theta_i}$$

wherein 'n' is the refractive index of material between the planar beam splitter and the planar reflector, $\theta_i$ is the angle of incidence of the light beam on the beam splitter, and 'd' is the distance between two consecutive multiple light beams which are output from the multiple beam generator and prior to said multiple light beams being incident on the focusing lens.

14. The optical assembly of claim 11, wherein the screen comprises a microlens array and wherein the microlens array comprises different sized microlens so that the microlens array has a plurality of different pitch lengths between microlens, or wherein the screen comprises a micromirror array wherein the micromirror array comprises different sized micromirrors so that the micromirror array has a plurality of different pitch lengths between micromirrors.

15. The optical assembly of claim 14, wherein the pitch (P) between consecutive microlens' is equal to:

$$P=(P_{eff}/\cos\Theta_{scan})$$

wherein $P_{eff}$ is a predefined effective pitch value and $\Theta_{scan}$ is the angle of incidence of the light from the projector device on the microlens'.

16. The optical assembly of claim 14, wherein the pitch (P) between consecutive microlens' is equal to:

$$P = \frac{(2k+1)\lambda}{2\tan^{-1}\left\{\frac{2h}{F}\tan\left[\sin^{-1}\left(\frac{\sin\theta_i}{n}\right)\right]\cos\theta_i\right\}}$$

wherein k is an integer which is the order of the multiple beam generator, $\Theta i$ is the angle of incidence of the light beam of the planar beam splitter, F is the focal length of the collimating lens, $\lambda$ is the wavelength of the light beam, 'h' is the distance between the planar beam splitter and the planar reflector, n is the refractive index of material between the planar beam splitter and the planar reflector.

* * * * *